(12) United States Patent
Miller et al.

(10) Patent No.: US 9,429,953 B1
(45) Date of Patent: Aug. 30, 2016

(54) AUTONOMOUSLY LANDING AN UNMANNED AERIAL VEHICLE

(71) Applicant: Skycatch, Inc., San Francisco, CA (US)

(72) Inventors: Samuel Giles Miller, Folsom, CA (US); Christian Sanz, San Francisco, CA (US); Behrooze Sirang, San Francisco, CA (US); Jonathan Shyaun Noorani, Orangevale, CA (US)

(73) Assignee: SKYCATCH, INC., San Francisco, CA (US)

( * ) Notice: Subject to any disclaimer, the term of this patent is extended or adjusted under 35 U.S.C. 154(b) by 0 days.

(21) Appl. No.: 14/835,510

(22) Filed: Aug. 25, 2015

(51) Int. Cl.
- G05D 1/12 (2006.01)
- G01S 19/01 (2010.01)
- G05D 1/06 (2006.01)
- G05D 1/00 (2006.01)

(52) U.S. Cl.
CPC ............. *G05D 1/0676* (2013.01); *G01S 19/01* (2013.01); *G05D 1/0011* (2013.01); *G05D 1/12* (2013.01)

(58) Field of Classification Search
CPC ......... G05D 1/12; G01S 19/01; B64C 27/08; H02J 7/0042
USPC ................................................ 701/2, 16, 18
See application file for complete search history.

(56) References Cited

U.S. PATENT DOCUMENTS

| | | | |
|---|---|---|---|
| 6,148,250 A | 11/2000 | Saneyoshi et al. | |
| 9,139,310 B1 * | 9/2015 | Wang | B64F 1/36 |
| 2005/0125142 A1 * | 6/2005 | Yamane | G01C 11/00 701/510 |
| 2009/0055038 A1 | 2/2009 | Garrec et al. | |
| 2012/0158222 A1 * | 6/2012 | Ehlin | G01S 17/023 701/16 |
| 2014/0032034 A1 | 1/2014 | Raptopoulos et al. | |
| 2014/0236390 A1 | 8/2014 | Mohamadi | |

FOREIGN PATENT DOCUMENTS

KR 10-2013-0122715 A 11/2013

OTHER PUBLICATIONS

International Search Report & Written Opinion issued in PCT/US2015/054737 mailed May 25, 2016.

* cited by examiner

*Primary Examiner* — Tan Q Nguyen
(74) *Attorney, Agent, or Firm* — Keller Jolley Preece

(57) ABSTRACT

The present disclosure is directed toward systems and methods for enabling autonomous landing of an unmanned aerial vehicle. For example, systems and methods described herein enable autonomous landing of the unmanned aerial vehicle by providing an unmanned aerial vehicle ground station with various guidance systems for guiding the autonomous landing. In some embodiments, the guidance systems enable autonomous landing by providing one or more LEDs. In other embodiments, the guidance systems enable autonomous landing by providing various types of transmitted energy waves. In at least one embodiment, the guidance systems enable autonomous landing by providing a two-stage landing system that includes two or more types of transmitted energy.

20 Claims, 12 Drawing Sheets

AUTONOMOUSLY LANDING AN UNMANNED AERIAL VEHICLE

CROSS REFERENCE TO RELATED APPLICATIONS

N/A

BACKGROUND

1. Technical Field

One or more embodiments described herein relate generally to autonomous flight of an unmanned aerial vehicle. More specifically, one or more embodiments relate to autonomous landing of an unmanned aerial vehicle.

2. Background and Relevant Art

Aerial photography and videography are valuable tools in many applications, particularly those involving large geographic areas, such as construction, agriculture, mining, real estate, search and rescue, and surveillance. Traditionally, aerial perspectives have been obtained using photography or videography from manned aircraft or satellites. Both of these options are very costly, and neither option provides a cost-effective process to obtain real-time or near real-time imagery.

Due to these limitations, there is increasing interest in the use of unmanned aerial vehicles ("UAVs") to obtain aerial imagery. For example, a UAV including an on-board camera can easily fly over various geographic areas in order to collect overhead photographs and/or videos. Typically, UAVs are remote controlled, thus necessitating an operator to control the movements of the UAV. This becomes problematic, however, when the UAV is deployed over harsh terrain (e.g., mountains) or over large areas of land. In such cases, an operator would have difficulty finding a control position (e.g., the physical location of the operator) to allow the operator to successfully control the UAV. For instance, mountains or large areas of land will generally not allow an operator to maintain the UAV within a viewing range to successfully operate the UAV.

In some circumstances, the UAV operator does not need to be within a viewing range of the UAV. For example, some conventional UAVs provide an operator real-time video captured from the UAV for long-range remote control of the UAV. In a long-range remote control scenario, however, additional problems arise with conventional UAVs and conventional UAV systems. For example, long-range remote control scenarios often include the need to remotely land a UAV (e.g., in order to recharge a battery). The remote landing process for an operator, however, is often difficult and error-prone, which increases the probability of damaging or destroying a UAV, resulting in considerable expense. In addition, a damaged UAV can delay a project, causing additional time and expense.

Using conventional UAV systems, some operators can become fairly proficient in remotely landing a UAV. Frequently, however, an operator requires extensive training and practice to be able to successfully remotely land a UAV on a consistent basis. The time and expense required to train an operator to perform remote UAV landings is cost prohibitive to many companies that would benefit from the use of a UAV. Moreover, even when adequately trained, an operator still has a fairly high risk of damaging or destroying a UAV during a remote UAV landing.

Thus, there are several disadvantages to current methods for operating and landing a UAV.

SUMMARY

One or more embodiments described herein provide benefits and/or solve one or more of the foregoing or other problems in the art with systems and methods that enable autonomous landing of an unmanned aerial vehicle ("UAV"). For example, one or more embodiments include systems and methods that enable autonomous landing of an UAV by providing an optical guidance system that allows the UAV to guide itself onto a landing site of a UAV ground station ("UAVGS"). Additionally or alternatively, in one or more embodiments, the systems and methods enable autonomous landing of a UAV by using one or more energy waves to guide a UAV into a UAVGS.

For example, in at least one embodiment and in order to provide optical guidance to the UAV, the UAVGS can include one or more light emitting sources (e.g., LEDs). The systems and methods can provide light signals to the UAV from the UAVGS via the one or more light emitting sources. One or more embodiments described herein provide systems and methods to enable the UAV to detect the light signals from the light emitting diodes, and to guide itself to the UAVGS based on the detected light signals, thus completing an autonomous landing based on the light signals produced from the UAVGS.

Furthermore, in at least some embodiments, the systems and methods provide a fine-tuned landing sequence of a UAV over a range of altitudes as the UAV descends for landing in a UAVGS. For instance, example embodiments described herein include systems and methods to provide a two-phase landing system based on two different altitude ranges that the UAV will pass through during a descent toward landing at a UAVGS. For example, the systems and methods can use one type of energy wave to guide the UAV through a first altitude range. The system can then transition to a second type of energy wave when the UAV descends below a given altitude in order to provide the UAV with fine-tuned guidance into the UAVGS at lower altitudes.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
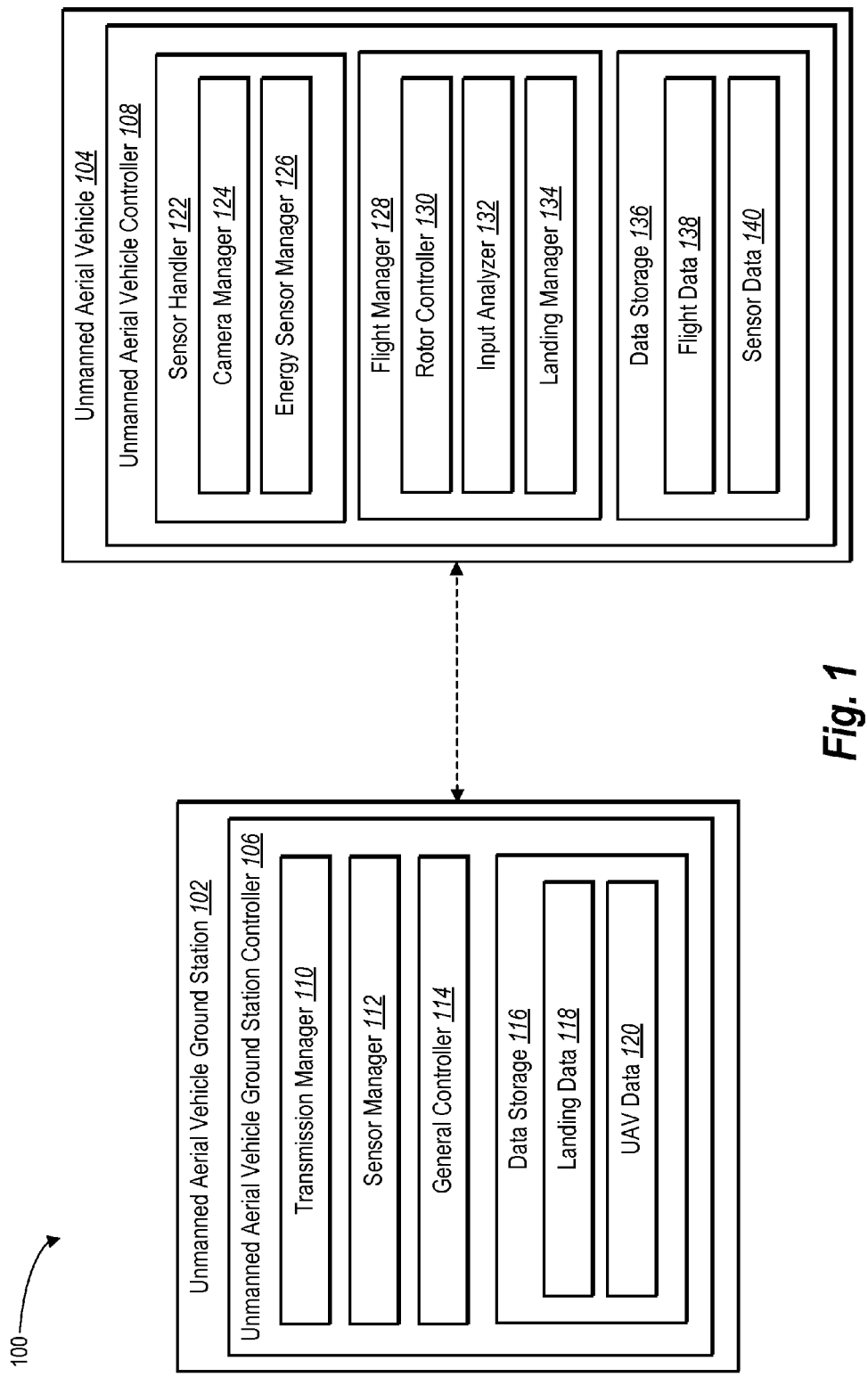
FIG. 1 illustrates a schematic diagram of an autonomous landing system in accordance with one or more embodiments.

One or more embodiments described herein include an autonomous landing system. For example, the autonomous landing system described herein manages an autonomous landing of an unmanned aerial vehicle ("UAV") in connection with a UAV ground station ("UAVGS"). The autonomous landing system described herein includes components that enable a UAV to autonomously land on a UAVGS regardless of the initial altitude of the UAV or the position of the UAVGS.

In one or more embodiments, the autonomous landing system described herein includes components that facilitate the autonomous landing of the UAV on the UAVGS by providing various guidance systems. For example, in one embodiment, the autonomous landing system can include energy transmitters on the UAVGS that produce an energy field that may be perceived by the UAV. For instance, in one or more embodiments, the energy transmitters can include light sources that produce light signals to form an energy field. The autonomous landing system can further include components housed on and/or within the UAV that utilize the light signals that the UAVGS produces to determine the UAV's altitude and an appropriate rate of descent, as well as the location of the UAVGS in order to autonomously guide the UAV to land on the UAVGS.

In one or more additional or alternative embodiments, the autonomous landing system described herein includes a guidance system that utilizes various other types of energy fields to assist the UAV in landing on the UAVGS. For example, in one embodiment, the autonomous landing system includes energy transmitters on the UAVGS that transmit various types of energy waves. Furthermore, the autonomous landing system can include energy wave sensors or receivers on the UAV that are capable of sensing the various types of energy waves transmitted by the UAVGS. In at least one embodiment, the autonomous landing system also includes components on the UAV that can determine the UAV's location, altitude, and rate of descent based on characteristics of the detected energy waves.

In at least one embodiment, in order to provide fine-tuned guidance of the UAV, the autonomous landing system can include components that allow for a two-stage autonomous landing of the UAV on the UAVGS. For example, if the UAV is unable to perceive the light signals (e.g., due to a dirty lens, poor weather conditions, bright sunlight, etc.) the UAV may utilize another type of energy wave for guidance at higher altitudes. Then, the UAV may transition to using the light signals when the UAV is within a threshold distance of the UAVGS. In another example, the UAV may only be able to detect a first type of energy at higher altitudes from the UAVGS, even though the UAVGS is actually transmitting the first type of energy as well as a second type of energy. When the UAV comes within a threshold distance of the UAVGS, the sensors of the UAV can detect the second type of energy in addition to the first type of energy. In at least one embodiment, the UAV can then utilize the second type of energy for final guidance in order to autonomously land on the UAVGS.

Thus, the autonomous landing system can provide for energy wave transmitters on the UAVGS that simultaneously transmit more than one type of energy wave. Furthermore, the autonomous landing system can provide for energy wave sensors on the UAV that sense more than one type of energy wave. Accordingly, the energy wave sensors on the UAV may sense one type of energy wave while the UAV is positioned at or above a defined altitude. Later, after descending below the defined altitude, the autonomous landing system can cause the energy wave sensors on the UAV to transition to sensing a second type of energy wave to provide fine-tuned guidance as the UAV lands on the UAVGS.

The term "unmanned aerial vehicle" ("UAV"), as used herein, generally refers to an aircraft that can be piloted autonomously or remotely by a control system. For example, a "drone" is a UAV that can be used for multiple purposes or applications (e.g., military, agriculture, surveillance, etc.). In one or more embodiments, the UAV includes onboard computers that control the autonomous flight of the UAV. In at least one embodiment, the UAV is a multi-rotor vehicle, such as a quadcopter, and includes a carbon fiber shell, integrated electronics, a battery bay, a global positioning system ("GPS") receiver, a fixed or swappable imaging capability (e.g., a digital camera), and various energy sensors or receivers. The UAV can also include a computing device including programmed instructions that allow the UAV to takeoff, fly, and land autonomously. The UAV is described in greater detail below with reference to FIG. 3.

The term "unmanned aerial vehicle ground station" ("UAVGS"), as used herein, generally refers to an apparatus from which a UAV can takeoff, and where the UAV can later land and be stored until its next flight. For example, the UAVGS can be a carbon fiber box containing a UAV storage area that functions as a takeoff area and/or a landing pad when the UAV is not being stored. In at least one embodiment, following the autonomous landing of the UAV, one or more systems of the UAVGS can recharge or swap-out one or more batteries of the UAV, download data (e.g., digital photographs, digital videos, sensor readings, etc.) collected by the UAV. At least one embodiment, the UAVGS can allow for wireless communication between the UAVGS and a server to transfer of data collected by the UAV and downloaded to the UAVGS to the server.

The term "energy wave," as used herein, refers to a wave of one of various types of energy. For example, an energy wave can refer to a wave of light energy. Light energy can be transmitted from any of a variety of sources (e.g., a light emitting diode, an incandescent light bulb, etc.), and can be any type of light in the visible or invisible spectrum. In one or more embodiments, the UAVGS can include one or more light sources in order to transmit light energy waves (sometimes referred to herein as "light signals").

Another type of energy wave contemplated by the autonomous landing system is electromagnetic energy. For example, the UAVGS can include one or more electromagnetic energy transmitters that transmit electromagnetic energy vertically from the UAVGS. Additionally, the autonomous landing system contemplates the use of radio frequency energy in order to provide guidance to the UAV during an autonomous landing sequence. Thus, the autonomous landing system contemplates any type of energy wave that can be transmitted by the UAVGS and sensed or received by the UAV.

In one or more embodiments, the autonomous landing system can alter any type of energy wave transmitted from the UAVGS. For example, in some embodiments, the autonomous landing system can cause alterations to a transmitted energy wave. For instance, the autonomous landing system can oscillate a transmitted energy wave, angle a transmitted energy wave, intensify the strength of a transmitted energy wave, turn a transmitted energy wave on and off, etc. In this way, the autonomous landing system can add patterns, "chirps," etc. to an energy wave.

An "energy field," as used herein, generally refers to a field wherein one or more energy waves are detectable. For example, in one or more embodiments, an energy field, as used herein, is a three-dimensional air space within which energy waves transmitted from the UAVGS are detectable by a sensor on the UAV. In one or more embodiments, an energy field can be different shapes (e.g., columnar, conical, spherical, etc.), can include energy waves of varying intensities (e.g., energy waves located toward the center of the energy field can be more intense than energy waves located toward the outside edges of the energy field), can include energy waves of different types, etc.

Furthermore, in one or more embodiments, an energy field can be associated with various characteristics. For example, the characteristics of a particular energy field can include the type of energy waves contained by the particular energy field, the intensity of the energy waves contained by the particular energy field, the shape of the energy field, any transmission patterns utilized within the particular energy field, maximum effective range of the energy waves within the particular energy field, minimum effective range of the energy waves within the particular energy field, etc. In at least one embodiment, the autonomous landing system can utilize one or more characteristics of an energy field in the various decisions included in an autonomous landing sequence of the UAV.

FIG. 1 illustrates a schematic diagram illustrating an example embodiment of an autonomous landing system 100 (or simply "system 100"). As shown in FIG. 1, the system 100 may include various components for performing the processes and features described herein. For example, as shown in FIG. 1, the system 100 may include, but is not limited to, an unmanned aerial vehicle ground station ("UAVGS") 102 and an unmanned aerial vehicle ("UAV") 104. The UAVGS 102 can include a UAVGS controller 106, which in turn can include, but is not limited to, a transmission manager 110, a sensor manager 112, a general controller 114, and a data storage 116. The UAV 104 can include a UAV controller 108, which in turn can include, but is not limited to, a sensor handler 122, a flight manager 128, and a data storage 136. As shown in FIG. 1, the sensor handler 122 can include a camera manager 124 and an energy sensor manager 126. In addition, the flight manager 128 can include a rotor controller 130, an input analyzer 132, and a landing manager 134. As FIG. 1 further shows, the data storage 136 can include flight data 138 and sensor data 140.

Each of the components 110-120 of the UAVGS controller 106, and the components 122-140 of the UAV controller 108 can be implemented using a computing device including at least one processor executing instructions that cause the system 100 to perform the processes described herein. In some embodiments, the components 106, 108, 110-120, and 122-140 can comprise hardware, such as a special-purpose processing device to perform a certain function. Additionally or alternatively, the components 106, 108, 110-120, and 122-140 can comprise a combination of computer-executable instructions and hardware. For instance, in one or more embodiments the UAV and/or the UAVGS includes one or more computing devices, such as the computing device described below with reference to FIG. 8. In one or more embodiments, the UAVGS controller 106 and the UAV controller 108 can be native applications installed on the UAVGS 102 and the UAV 104, respectively. In some embodiments, the UAVGS controller 106 and the UAV controller 108 can be remotely accessible over a wireless network.

As described above, the system 100 includes components across both the UAVGS 102 and the UAV 104 that enable the UAV 104 to autonomously land on the UAVGS 102. Accordingly the system 100 includes various components that autonomously guide the UAV 104 to land on the UAVGS 102 without any external intervention (e.g., without an operator remotely controlling the UAV during the landing process). As mentioned above, the guidance system can include the use of transmitters on the UAVGS 102 that each transmits one or more different types of energy. Also as mentioned above, the guidance system can include the use of sensors on the UAV 104 that each detects one or more of types of energy that the UAVGS 102 transmits. By utilizing the transmitters on the UAVGS 102 to transmit energy, and the sensors on the UAV 104 to detect the energy, the system 100 can autonomously guide and land the UAV 104 onto the UAVGS 102.

Accordingly, as mentioned above and as illustrated in FIG. 1, the UAVGS controller 106 includes a transmission manager 110. In one or more embodiments, the transmission manager 110 controls the transmissions of all applicable types of energy from the UAVGS 102 for the purpose of guiding a UAV 104 for autonomous landing at the UAVGS 102. For example, the transmission manager 110 can control transmissions of energy from the UAVGS 102 including light energy, electromagnetic energy, radio frequency energy, infrared energy, and other types of detectable energy.

In one or more embodiments, the transmission manager 110 can control a pattern of transmission for each of the types of energy emitted by the UAVGS 102. For example, in at least one embodiment, the transmission manager 110 can cause a type of energy wave to be transmitted to produce an energy field that emanates or extends directly from a landing site of the UAVGS 102. In one or more embodiments, the transmission manager 110 can transmit energy waves to form an energy field having various shapes. For example, the transmission manager 110 can cause an energy field to have a cylindrical shape, a columnar shape, or a conical shape (e.g., FIG. 6A).

In an additional or alternatively embodiment, the transmission manager 110 can alter the beam spread of the energy field transmitted from the UAVGS 102. For example, by adding as little as a few degrees of beam spread to the transmitted energy field, the transmission manager 110 can change the pattern of transmission created by the energy field from a cylindrical pattern to a conical pattern emanating from the UAVGS 102. In one or more examples, the transmission manager 110 causes the beam spread to be about three degrees. In additional or alternative embodiments, the beam spread can be greater than three degrees, for example four degrees, five degrees, ten degrees or more. Moreover, the beam spread can be less than three degrees, for example two degrees, one degree, or less.

In addition to controlling the energy field shape created by a type of energy wave transmitted from the UAVGS 102, the transmission manager 110 can also control the signal strength, or intensity, associated with a type of energy wave transmitted from the UAVGS 102. For example, different types of energy waves are capable of being broadcast or transmitted at different signal strengths. In at least one embodiment, the transmission manager 110 can cause the transmission of a certain type of energy wave to be stronger or weaker in order to reach a larger or smaller area or altitude. To illustrate in one embodiment, the transmission manager 110 can transmit a radio frequency signal at up to 25 gHz. In additional or alternative embodiments, the transmission manager 110 can transmit a radio frequency signal at more or less than 25 gHz, depending on the particular application.

Additionally, different types of energy waves are also capable of being transmitted in different signal modulations. For example, in at least one embodiment, the transmission manager 110 can cause a type of energy wave to include various types of modulations. To illustrate, the transmission manager 110 can modulate a radio frequency energy wave to include a modulated pattern (e.g., a radio frequency "chirp"). In another illustration, the transmission manager 110 can modulate the wavelength of light from a light emitting diode ("LED"), or simply turn one or more LEDs on or off to produce a distinct light signal.

The transmission manager 110 is also capable of providing simultaneous transmission of two or more types of energy waves. For example, in at least one embodiment, in order to facilitate a two-phase landing of the UAV 104, the UAVGS 102 can transmit more than one type of energy wave (e.g., produce more than one energy field). The UAVGS 102 can transmit a first type of energy wave to produce a large energy field that can provide long-range guidance to the UAV 104, and can transmit a second type of energy wave to produce a smaller energy field that can provide close-range guidance to the UAV 104. For instance, in one embodiment, the transmission manager 110 may transmit a radio frequency energy wave for long-range guidance of the UAV, and an electromagnetic energy wave for short-range guidance of the UAV. Accordingly, the transmission manager 110 can control the transmissions of both the first and the second types of energy waves from the UAVGS 102. In one or more embodiments, the transmission manager 110 can control simultaneous transmissions of multiple types of energy waves by controlling the pattern, the signal strength, and the modulation associated with each of the multiple types of energy waves transmitted from the UAVGS 102.

As mentioned above, and as illustrated in FIG. 1, the UAVGS controller 106 also includes a sensor manager 112. In one or more embodiments, the transmission manager 110 may control the transmission of different types of energy based on conditions surrounding the UAVGS 102. For example, on a foggy day, the transmission manager 110 may determine to transmit a type of energy wave other than a light energy wave because the light energy wave would be hard for the UAV 104 to perceive through the fog. Accordingly, in order to identify conditions surrounding the UAVGS 102, the sensor manager 112 can sense various conditions including weather conditions (e.g., rain, fog, etc.), barometric pressure, wind, light, and so forth.

Also as mentioned above, and as illustrated in FIG. 1, the UAVGS controller 106 includes a general controller 114. In one or more embodiments, the general controller 114 can handle general system tasks such as power management, data storage, UAV docking, etc. For example, in some embodiments, after the UAV 104 autonomously lands on the UAVGS 102, the general controller 114 can manage docking the UAV 104, recharging one or more batteries housed by the UAV 104, downloading data collected by the UAV 104, etc.

Furthermore, as mentioned above, and as illustrated in FIG. 1, the UAVGS controller 106 also includes a data storage 116. As shown, the data storage 116 can include landing data 118, and UAV data 120. In one or more embodiments, the landing data 118 can include data representative of landing information associated with the UAV 104, such as described herein. Similarly, in one or more embodiments, the UAV data 120 can include data representative of information associated with the UAV 104, such as described herein.

As described above, the system 100 enables the UAV 104 to land autonomously on the UAVGS 102. Accordingly, in one or more embodiments, the UAV 104 includes a UAV controller 108 that detects and uses the energy provided by the UAVGS 102 to autonomously land the UAV 104 on the UAVGS 102. In particular, the UAV controller 108 detects the energy the UAVGS 102 transmits, and then uses the detected energy to determine how to guide the UAV 104 (e.g., based on one or more characteristics of the detected energy, the UAV controller 108 can cause the UAV 104 to perform one or more maneuvers).

As shown in FIG. 1, the UAV controller 108 includes a sensor handler 122. In general, the sensor handler 122 can handle (e.g., generate input) based on the one or more sensors detecting the energy field that the UAVGS 102 transmits. As further shown in FIG. 1, the sensor handler 122 includes a camera manager 124 and an energy sensor manager 126. For example, in one or more embodiments, the UAV 104 can include one or more cameras, and/or other types of energy wave sensors (e.g., electromagnetic energy wave sensors, infrared energy wave sensors, radio frequency wave sensors, etc.). Thus, in one or more embodiments, the camera manager 124 can handle all activities related to a camera included on the UAV 104, and the energy sensor manager 126 can handle all activities related to the energy sensors included on the UAV 104.

To illustrate, the camera manager 124 can manage camera direction, camera angle, camera filters, camera field of view (e.g., zoom in, zoom out), etc. For example, in one embodiment, the camera manager 124 may pan and zoom a camera associated with the UAV 104 until a light source is detected. The camera manager 124 may then pass the detected light through a pass filter in order to determine whether the detected light is part of a guidance system provided by the UAVGS 102. In response to determining the detected light is the correct wavelength, the camera manager 124 can lock on and track the light until the UAV 104 is safely landed, as described in additional detail with respect to FIGS. 4A-4C below.

Similarly, the energy sensor manager 126 can manage energy sensor activation, energy sensor sensitivity, etc. For example, the energy sensor manager 126 can determine when one or more energy sensors detect an energy field. In one or more embodiments, the energy sensor manager 126 can continuously compare detected energy waves at each of the energy sensors on the UAV 104 to determine the detection of an energy field that the UAVGS 102 emits. In response to determining that one of the energy sensors detects an energy field, the energy sensor manager 126 can provide an input to the flight manager 128 that indicates the detection of the energy field. In at least one embodiment, when all energy sensors detect the energy field, the flight manager 128 can determine that the UAV 104 is wholly within the energy field transmitted from the UAVGS 102, as will be described further below.

As mentioned above and as illustrated in FIG. 1, the UAV controller 108 also includes a flight manager 128. In one or more embodiments, and in order for the UAV 104 to autonomously land on the UAVGS 102, the flight manager 128 can control all of the mechanical flight elements associated with the UAV 104 (e.g., motors, rotor arms, rotors, landing gear, etc.). For example, in at least one embodiment, the flight manager 128 can receive inputs from the sensor handler 122. The flight manager 128 can then control various mechanical features of the UAV 104 based on the received inputs from the sensor handler 122 in order to autonomously land the UAV 104 on the UAVGS 102.

As illustrated in FIG. 1, the flight manager 128 includes a rotor controller 130. In one or more embodiments, the rotor controller 130 controls the speed of one or more rotors associated with the UAV 104. For example, in one embodiment, the UAV 104 includes four horizontally mounted rotors. Accordingly, by controlling the speed of the horizontally mounted rotors, the rotor controller 130 can cause the UAV 104 to travel up and down vertically. Additionally, in at least one embodiment, the rotor controller 130 controls the pitch of one or more rotors associated with the UAV 104. Accordingly, by controlling the pitch of one or more rotors associated with the UAV 104, the rotor controller 130 can cause the UAV 104 to travel back and forth, and side to side horizontally. Thus it follows that, by controlling the speed and pitch of one or more rotors associated with the UAV 104, the rotor controller 130 can cause the UAV 104 to travel anywhere within an uninhibited three-dimensional space.

Also as illustrated in FIG. 1, the flight manager 128 includes an input analyzer 132. In one or more embodiments, the input analyzer 132 analyzes the data or inputs received from the sensor handler 122 in order to determine a position of the UAV 104. For example, in one embodiment, the input analyzer 132 can analyze digital photographs or video provided by the camera manager 124 do determine whether the UAV 104 is located in a position above the UAVGS 102. In another example, the input analyzer 132 can analyze energy sensor readings of an energy wave to determine how far above the UAVGS 102 the UAV is located 104 (e.g., the altitude of the UAV). The input analyzer 132 can utilize algorithms, lookup tables, etc. in order to determine the UAV's 104 position based on inputs received from the sensor handler 122. Additionally, in at least embodiment, the input analyzer 132 can receive inputs from a global position system (not shown in FIG. 1) associated with the UAV 104 in order to determine the UAV's 104 position.

Once the input analyzer 132 determines the position of the UAV 104, the landing manager 134 can determine how the UAV's 104 position needs to change in order to complete an autonomous landing sequence. In one or more embodiments, the landing manager 134 includes various flight sequences that include decision trees to determine how to move the UAV 104 from one landing phase to the next. For example, landing phases in an autonomous landing sequence can include: a centering phase, wherein the landing manager 134 centers the UAV 104 over the UAVGS 102; a descent phase, wherein the landing manager 134 causes the UAV 104 to move toward the UAVGS 102 in a controlled descent; a correction phase, wherein the landing manager 134 corrects the position of the UAV 104 due to a gust of wind or debris interference; and a docking phase, wherein the landing manager 134 causes the flight components of the UAV 104 to shut off, effectively docking the UAV 104 in the UAVGS 102. Accordingly, the input analyzer 132 can comprise various sets of instructions or decisions trees that correspond to each of the phases of a landing sequence.

To illustrate, in one example, the input analyzer 132 may determine, based on inputs from the sensor handler 122, that the UAV 104 is positioned within an energy field transmitted from the UAVGS 102, but is not directly centered over the UAVGS 102. Accordingly, the landing manager 134 can determine in which direction the UAV 104 needs to move in order for the UAV 104 to be positioned directly over the UAVGS 102. In at least one embodiment, the landing manager 134 can make this determination by determining which energy sensor associated with the UAV 104 is detecting the most intense energy waves, and determining that the UAV 104 needs to move in the direction of that energy sensor. In an alternative embodiment, the landing manager 134 can make this determination by identifying where, in a digital photograph captured by the camera manager 124, a light signal is located relative to the edges of a digital image. Based on this identification, the landing manager 134 can use a predetermined lookup table to determine how far the UAV 104 needs to move and in what direction in order for the UAV 104 to position itself directly above the UAVGS 102.

To move from the centering phase of the autonomous landing sequence to the descent phase of the autonomous landing sequence, the landing manager 134 can utilize the vertical position of the UAV 104, as determined by the input analyzer 132, in order to determine an appropriate rate of descent for the UAV 104. For example, if the input analyzer 132 determines that the UAV 104 is at a large vertical distance above the UAVGS 102, the landing manager 134 can cause the rotor controller 130 to allow a sharp drop off in the speed of the rotors associated with the UAV 104 in order to cause a rapid descent of the UAV 104. When the UAV 104 is within a threshold vertical distance above the UAVGS 102, the landing manager 134 can cause the rotor controller 130 to slightly increase the speed of the rotors in order to slow the UAV's 104 rate of descent.

If the UAV 104 is subjected to a gust of wind or some other unforeseen event, the UAV 104 can require course correction in order to continue in an autonomous landing sequence. For example, if during a correction phase, the UAV 104 slips horizontally out of an energy field, the landing manager 134 can cause the rotor controller 128 to increase the speed of the rotors. This causes the UAV 104 to ascend vertically upwards. Thus, the landing manager 134 can transition back to a centering phase such that the UAV 104 can again center itself over the UAVGS 102 and proceed with the landing sequence.

Once the UAV 104 position provided by the input analyzer 132 indicates that the UAV 104 is within docking distance from the UAVGS 102 (e.g., within a range of a few inches to touching the landing site of the UAVGS), the landing manager 134 can cause the rotor controller 130 to cut all power to the rotors associated with the UAV 104. With no power to the rotors, the UAV 104 is effectively docked at the landing site of the UAVGS 102.

Furthermore, as mentioned above, and as illustrated in FIG. 1, the UAV controller 108 also includes a data storage 140. As shown, the data storage 140 can include flight data 142 and sensor data 144. In one or more embodiments, the flight data 142 can include data representative of the UAV's 104 flight, such as described herein (e.g., GPS information, camera information, etc.). Similarly, in one or more embodiments, the sensor data 144 can include data representative of information gathered by one or more sensors located on the UAV 104.

Figure 2:
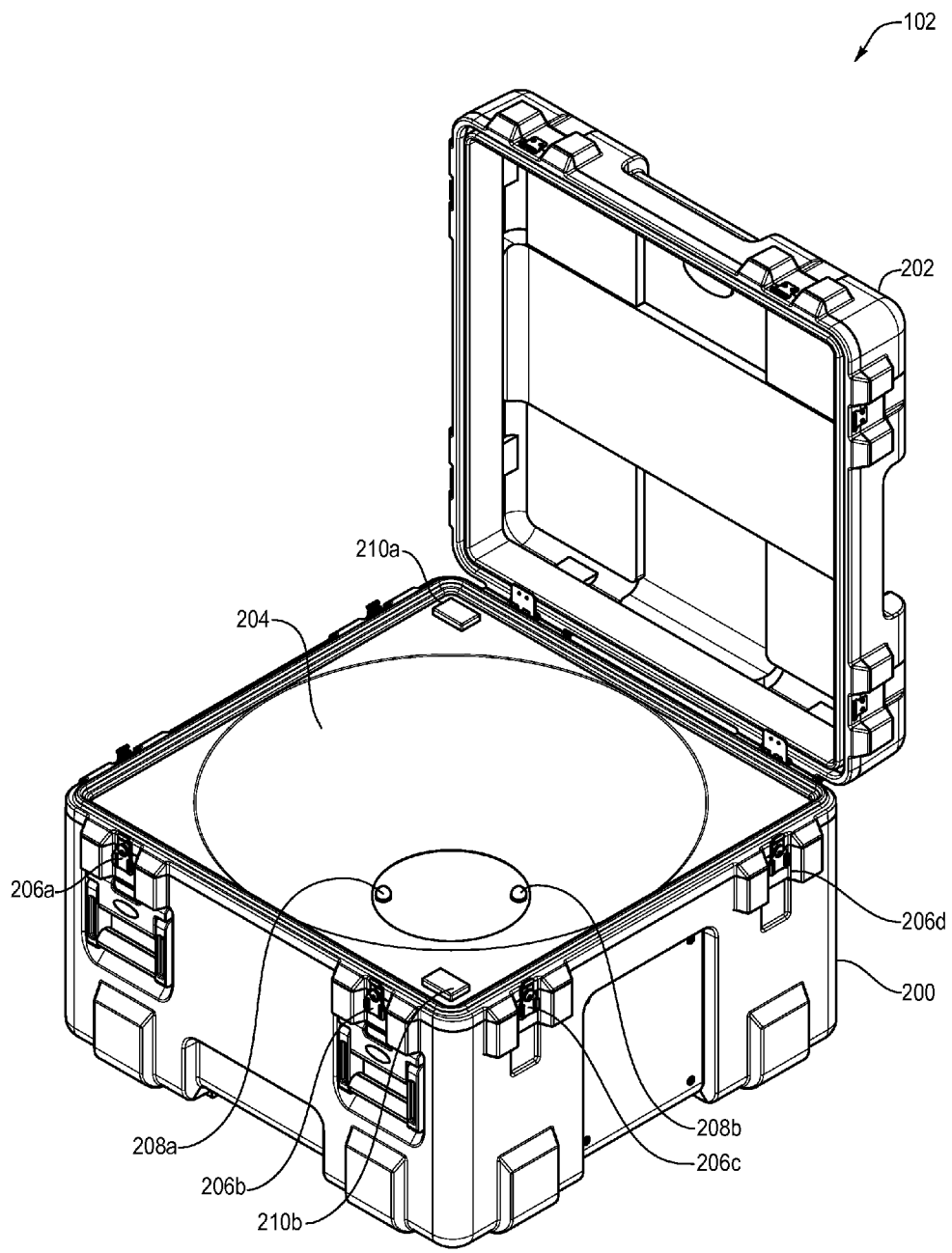
FIG. 2 illustrates a side-perspective view of an unmanned aerial vehicle ground station in accordance with one or more embodiments.
Figure 3:
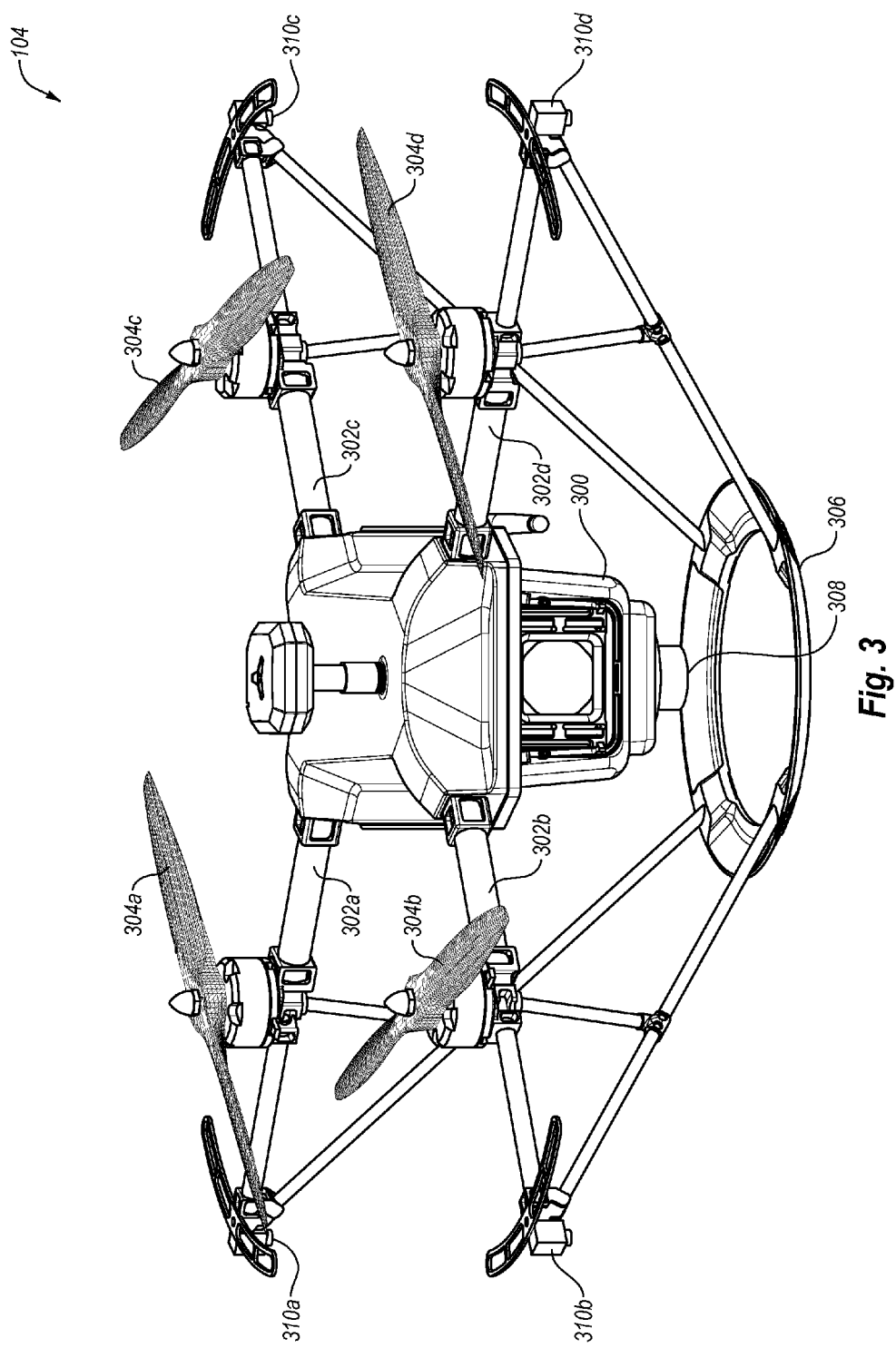
FIG. 3 illustrates a side-perspective view of an unmanned aerial vehicle in accordance with one or more embodiments.

FIGS. 2 and 3 illustrate a perspective view of a UAVGS 102 and a UAV 104, respectively. For example, as shown in FIG. 2, the UAVGS 102 includes a base 200 with a hinged lid 202. In one or more embodiments, the hinged lid 202 can be secured to the base 200 with one or more latches 206a, 206b, 206c, and 206d. In some embodiments, the hinged lid 202 is removable from the base 200. For example, the hinged lid 202 may be removed from the base 200 in order to minimize any possible interference with the UAV 104 during an autonomous landing of the UAV 104. Alternatively or additionally, the hinged lid 202 may be removed from the base 200 in order to prevent the UAVGS 102 from blowing over in the wind.

Also as illustrated in FIG. 2, the base 200 of the UAVGS 102 can include a landing site 204. For example, and as illustrated in FIG. 2, the landing site 204 can include a recess. In one or more embodiments, the landing site 204 includes a conical recess, or a recess shaped as a funnel. For example, depending on the configuration of the UAV 104 landing on the UAVGS 102, the conical landing site 204 can help guide the UAV 104 into proper position to enable the UAV 104 to correctly dock with the UAVGS 102. In additional or alternative embodiments, the landing site 204 can include a recess or protrusion that is cylindrical, hemispherical, cubical, or any other shape in order to appropriately accommodate docking the UAV 104.

Furthermore, as shown in FIG. 2, the base 200 of the UAVGS 102 can also include a plurality of light emitting diodes ("LEDs") 208a, 208b located at the bottom of the landing site 204. As described above, in at least one embodiment, the UAVGS controller 106 can cause the LEDs 208a, 208b to emit light at certain frequencies, wavelengths, and intensities. For example, in some embodiments, the UAVGS controller 106 may cause the LEDs 208a, 208b to light up at a higher intensity in response to the sensor manager 112 detecting foggy conditions.

Additionally, as shown in FIG. 2, the base 200 of the UAVGS 102 can also include a plurality of energy transmitters 210a, 210b located adjacent to the landing site 204. As mentioned above, in one or more embodiments, the energy transmitters 210a, 210b can transmit a single type of energy. Alternatively, the energy transmitters 210a, 210b can each transmit two or more types of energy waves, or the energy transmitter 210a can transmit a first type of energy wave while the energy transmitter 210b can transmit a second type of energy wave. Regardless of the configuration of the energy transmitters 210a, 210b, the types of energy waves transmitted by the energy transmitters 210a, 210b can include one or more of infrared energy waves, radio frequency energy waves, electromagnetic energy waves, etc. In additional embodiments, the UAVGS 102 can include more or fewer energy transmitters than illustrated in FIG. 2.

In one or more embodiments, the energy wave transmitters 210a, 210b can be lens antenna that work in connection with an oscillator. For example, if the energy wave transmitters 210a, 210b transmit radio frequency waves, the lens antenna can create a linear energy field that the oscillator can change to a circularly polarized energy field, thus creating a circular energy field. Additionally, the energy wave transmitters can include various optic lenses that create a beam spread to the circular energy field. Accordingly, in at least one embodiment, the resulting energy field is conical. For example, if the energy transmitters 210a, 210b create a conical energy field with a three degree beam spread, the highest intensity of energy waves within the energy field are concentrated at the center of the energy field, and the intensity of the energy waves taper off by as much as fifty percent at three degrees away from the center of the energy field.

As discussed above, the autonomous landing system 100 enables a UAV 104 to land autonomously on a UAVGS 102. Accordingly, one embodiment of the UAV 104 is illustrated in FIG. 3. As shown, the UAV 104 can include a body 300 and a plurality of rotor arms 302a, 302b, 302c, and 302d, each supporting a rotor 304a, 304b, 304c, and 304d, respectively. It will be understood that by varying the pitch and speed of the rotors 304a, 304b, 304c, and 304d, the flight manager 128 can control the UAV's 104 speed, direction, and altitude. For example, as discussed above, the rotor controller 130 can control the pitch and speed of the rotors 304a-304d in order to move the UAV 104 within a three-dimensional space. In additional or alternative embodiments, the UAV 104 may include fewer or more rotor arms and rotors, depending on various factors such as the weight of the UAV 104. Additionally, as discussed above, the UAV 104 can include a computing device, such as described below with reference to FIG. 8, to use for controlling the UAV based on input provided from one or more sensors.

Also as shown in FIG. 3, the UAV 104 can also include a landing base 306. In one or more embodiments, the landing base 306 is conical so as to correspond with the landing site 204, as shown in FIG. 2. For example, the landing base 306 of the UAV 104 and landing site 204 of the UAVGS 102 function in concert to effectively funnel the UAV 104 into correct position in the final phase of the UAV's 104 autonomous landing. In additional or alternative embodiments, the landing base 306 may include various mechanisms that allow the UAVGS 102 to lock the UAV 104 into the UAVGS 102 upon a completed autonomous landing. Furthermore, in one or more embodiments, the landing base 306 may include various mechanisms that allow the UAV 104 to engage with the UAVGS 102 in order to download data, recharge batteries, etc.

Additionally, as shown in FIG. 3, the UAV 104 can include a camera 308. As discussed above, the UAV controller 108 can utilize digital images and/or video captured by the camera 308 to aid in autonomously landing the UAV 104. In one or more embodiments, the camera 308 can be mounted on a gimbal allowing the camera to continuously point directly downward, even if the UAV 104 is not parallel with the ground. In additional embodiments, as described above, the camera manager 124 can control the camera 308 so as to apply filters, zoom in, zoom out, focus, etc. In one or more embodiments, the camera 308 can provide digital images and/or video to the camera manager 124 for utilization by the flight manager 128, as generally described above, and as will be described in detail with respect to FIGS. 4A-4C.

Furthermore, as shown in FIG. 3, the UAV 104 can include a plurality of sensors 310a, 310b, 310c, and 310d. Although the sensors 310a-310d are illustrated in FIG. 3 as being located at the distal ends of each of the rotor arms 302a-302d, in other embodiments, the sensors 310a-310d can be located anywhere along each of the rotor arms 302a-302d, or can be located on other portions of the UAV 104. Each of the sensors 310a, 310b, 310c, and 310d may detect a single type of energy, or multiple types of energy. Also, each of the sensors 310a, 310b, 310c, and 310d can detect energy at varying strengths, frequencies, and/or intensities. For example, in at least one embodiment, each of the sensors 310a-310d may be a patch antenna capable of measuring energy signal intensity. In one or more embodiments, the sensors 310a-310d can provide energy wave data and readings to the energy sensor manager 126 for utilization by the flight manager 128, as described above.

Figure 4A:
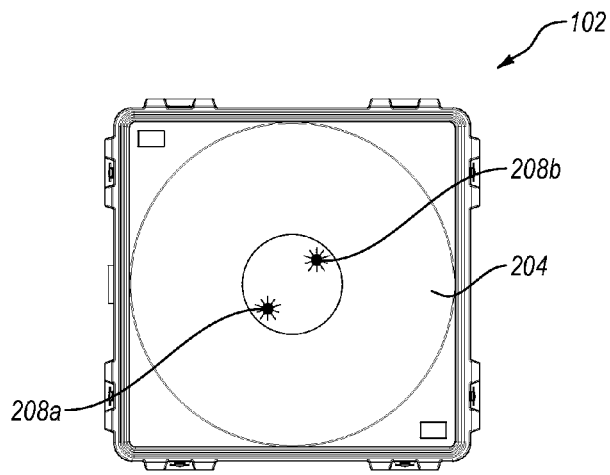
FIG. 4A illustrates a top-perspective view of an unmanned aerial vehicle ground station in accordance with one or more embodiments.

Regardless of the various features of the UAV 104, and as briefly explained above, the autonomous landing system 100 can utilize the LEDs 208a, 208b on the UAVGS 102 in order to provide guidance to the UAV 104. For example, FIG. 4A illustrates a top-perspective view of the UAVGS 102 from the perspective of the UAV 104, where the LEDs 208a, 208b are located at the bottom of the landing site 204. In one or more embodiments, the LEDs 208a, 208b may be visible from a high altitude, depending on the brightness and/or wavelength of the LEDs 208a, 208b and the current conditions surrounding the UAVGS 102 (e.g., sun, humidity, dust, etc.).

Figure 4B:
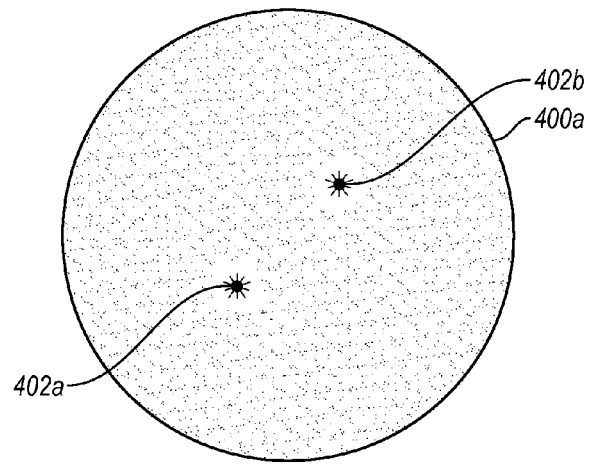
FIGS. 4B-4C illustrate example digital images representative of the view from a camera of the unmanned aerial vehicle in accordance with one or more embodiments.
Figure 4C:
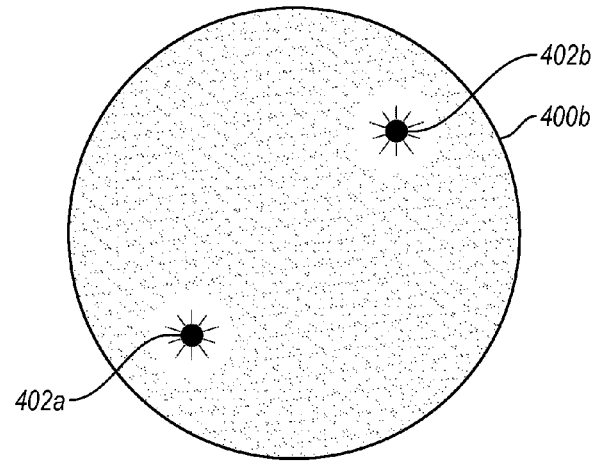

FIGS. 4B and 4C are example views of digital images captured by the camera 308 as the UAV 104 descends toward the UAVGS 102 for autonomous landing. For example, as shown in FIG. 4B, the digital image 400 shows the detected light spots 402a, 402b that create a light pattern resulting from the LEDs 208a, 208b, respectively. As mentioned above, and as illustrated in FIGS. 4B and 4C, the camera manager 124 can filter images taken by the camera 308 such that only the detected light spots 402a, 402b of the LEDs 208a, 208b can be perceived in the digital image 400a. In one or more embodiments, the camera manager 124 can filter images taken by the camera 308 digitally such that the camera manager 124 can adjust the filter level without having to wait for a physical camera filter to be affixed to the camera.

As shown in FIG. 4B, the distance between the lights 402a, 402b of the LEDs 208a, 208b are indicative of the altitude of the UAV 104. For example, as mentioned above, the flight manager 128 can analyze digital images to determine the distance between the detected light spots 402a, 402b. In at least one embodiment, because the light spots 402a, 402b are at a fixed position on the UAVGS 102, the flight manager 128 can determine the UAV's 104 altitude based on the distance between the lights 402a, 402b of the LEDs 208a, 208b. For instance, in at least one embodiment, the input analyzer 132 can utilize a lookup table that matches a distance between the light spots to a predetermined altitude of the UAV 104. As the UAV 104 descends over the UAVGS 102, the distance between the light spots 402a, 402b of the LEDs 208a, 208b increases because the UAV 104 is moving closer to the UAVGS 102. For example, as shown in FIG. 4C, the digital image 400b captured by the camera 308 shows an increase in the space between the light spots 402a, 402b, as compared to the digital image 400a in FIG. 4B.

Not only can the flight manager 128 determine an altitude of the UAV 104 based on the distance between the light spots 402a, 402b, but the flight manager 128 can also determine a rate of descent based on the altitude of the UAV 104 and the time in-between when the camera 308 captured the digital images 400a and 400b. Additionally or alternatively, the flight manager 128 can also determine a rate of descent based on the altitude of the UAV 104 and a rate at which the distance between the light spots 402a, 402b increases in a digital video.

Furthermore, the flight manager 128 can determine whether the UAV 104 has slipped off-course horizontally and/or rotationally by determining whether the light spots 402a, 402b of the LEDs 208a, 208b are centered and/or in the same orientation within the digital image 400b as compared to the digital image 400a. For example, the flight manager 128 can determine that the UAV 104 has slipped off-course by measuring the distance from each of the light spots 402a, 402b to the edge of the digital image 400b. If the distance from each of the light spots 402a, 402b to the edge of the digital image 400b is not the same, the flight manager 128 can determine that the UAV 104 is no longer centered over the UAVGS 102, and has thus slipped off-course.

In at least one embodiment, if the flight manager 128 determines that the UAV 104 is descending too fast or has slipped off-course, the flight manager 128 can take steps to correct the autonomous landing of the UAV 104. For example, in one embodiment, the flight manager 128 can slow a rapid descent. Additionally, in response to a determination that the UAV 104 has slipped horizontally, the flight manager 128 can correct the UAV's 104 course by maneuvering the UAV 104 such that the light spots 402a and 402b are each the same distance from the edge of the digital image 400b.

Figure 5A:
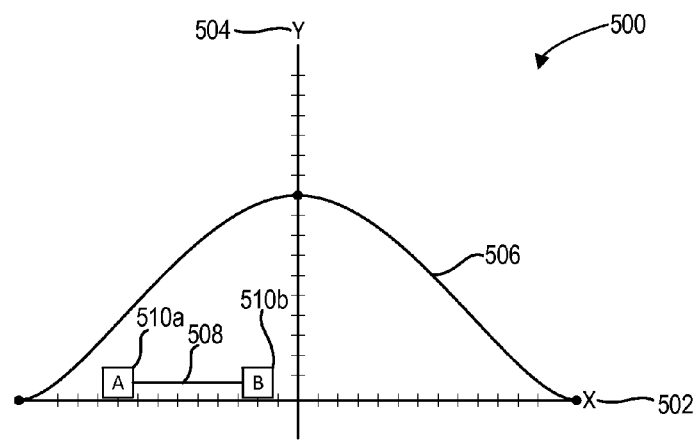
FIGS. 5A-5C illustrate a schematic diagram representing an energy intensity within an energy field in accordance with one or more embodiments.
Figure 5B:
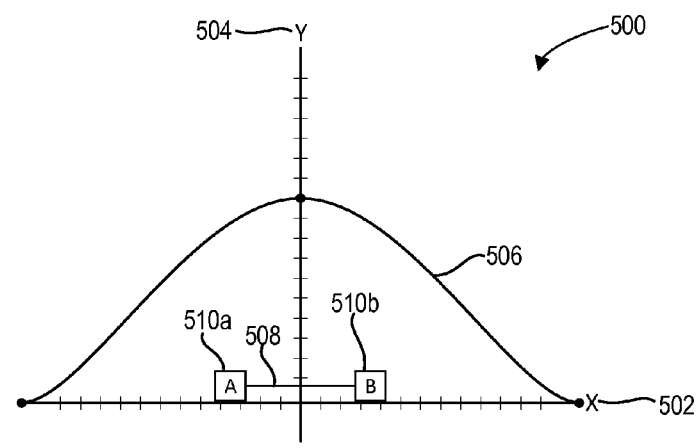
Figure 5C:
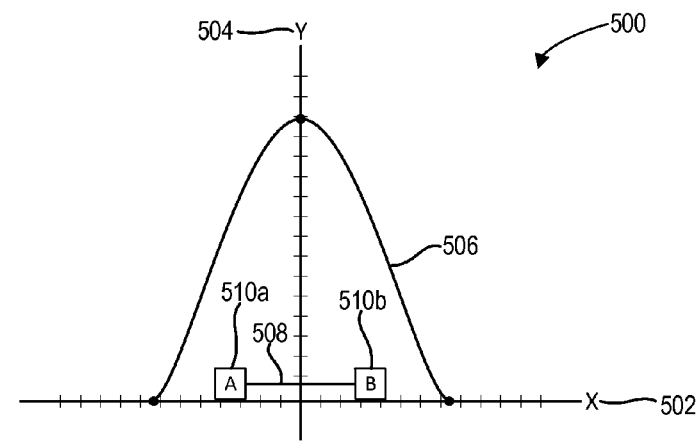

In addition to using light signals to create an energy field to guide the UAV 104 during a landing sequence, the system 100 can also use other types of energy waves in order to autonomously land the UAV 104 on the UAVGS 102. Also as mentioned above, the UAVGS 102 can transmit energy waves to produce an energy field wherein the intensity of the energy waves detected by the energy sensors 310a-310d of the UAV 104 can vary. In one or more embodiments, as shown in FIGS. 5A-5C, the intensity 500 of the energy waves detected by the UAV 104 can increase as the UAV 104 moves toward the center of the energy field. For example, as shown in FIG. 5A, the energy field 506 is represented as a bell curve wherein the intensity of the energy waves in the energy field is represented along the y-axis 504 and the distance from the center of the energy field 506 is represented along the x-axis 502.

Also as shown in FIG. 5A, an example UAV 508 can have two energy sensors 510a, 510b. As the UAV 508 moves toward the center of the energy field 506, the energy sensor 510b will detect a higher energy wave intensity than the energy sensor 510a. As described above, the landing manager 134 can determine that because the energy waves detected by the energy sensor 510b are more intense than the energy waves detected by the energy sensor 510a, the UAV 508 needs to move in a direction toward the energy sensor 510b in order for the UAV 508 to be centered within the energy field 506, and thus centered over the UAVGS 102. Accordingly, as shown in FIG. 5B, when the UAV 508 is centered within the energy field 506, the energy wave intensity detected by the energy sensor 510a is the same as the energy wave intensity detected by the energy sensor 510b.

For purposes of explanation, the two-dimensional representation of the example UAV 508 is shown in FIGS. 5A-5C with two energy sensors 510a, 510b. In additional or alternative embodiments, however, the example UAV 508 can include any number of additional energy sensors. For example, as described above, the example UAV 508 can represent the UAV 104 illustrated in FIG. 3 and described above. UAV 104 can include four energy sensors, with one energy sensor located on each rotor arm of the UAV 104. In additional embodiments, the UAV 104 can include multiple energy sensors on each rotor arm that can detect the same or different types of energy. Furthermore, in at least one embodiment, the UAV 104 can include a fifth energy sensor. For instance, the UAV 104 can include four energy sensors located on the rotor arms of the UAV 104 (e.g., one energy sensor located on each rotor arm), as well as a fifth energy sensor located on the main body of the UAV 104.

In one or more embodiments, the intensity of the energy waves within the energy field 506 increases not only as the UAV 508 moves toward the center of the energy field 506, but also as the UAV 508 descends toward the UAVGS 102. For example, the energy field 506 detected by the example UAV 508 as shown in FIGS. 5A and 5B is represented by the same bell curve because the altitude of the example UAV 508 did not change as it moved toward the center of the energy field 506. Once the example UAV 508 was centered in the energy field 506, as in FIG. 5B, the flight manager 128 can cause the example UAV 508 to begin its descent toward the UAVGS 102.

In one or more embodiments, as the example UAV 508 descends, the intensity 500 of the energy field 506 increases, as shown in FIG. 5C. As shown, even though the example UAV 508 is still centered within the energy field 506, the intensity of the energy waves detected by the energy sensors 510a, 510b of the example UAV 508 is much higher at a lower altitude, as the example UAV 508 approaches the UAVGS 102. Additionally, as described above, the energy field 506 can be conical in shape. As such, as shown in FIG. 5C, the width of the energy field 506 decreases as the example UAV 508 descends toward the UAVGS 102, thus precisely guiding the UAV 508 to the landing site of the UAVGS 102.

As generally described above, the UAV controller 108 can utilize two or more types of transmitted energy waves in order to perform a multi-stage autonomous landing of the UAV 104. The process by which the UAV controller 108 performs an autonomous landing of the UAV 104 by utilizing two types of transmitted energy waves is illustrated in FIGS. 6A-6E.

Figure 6A:
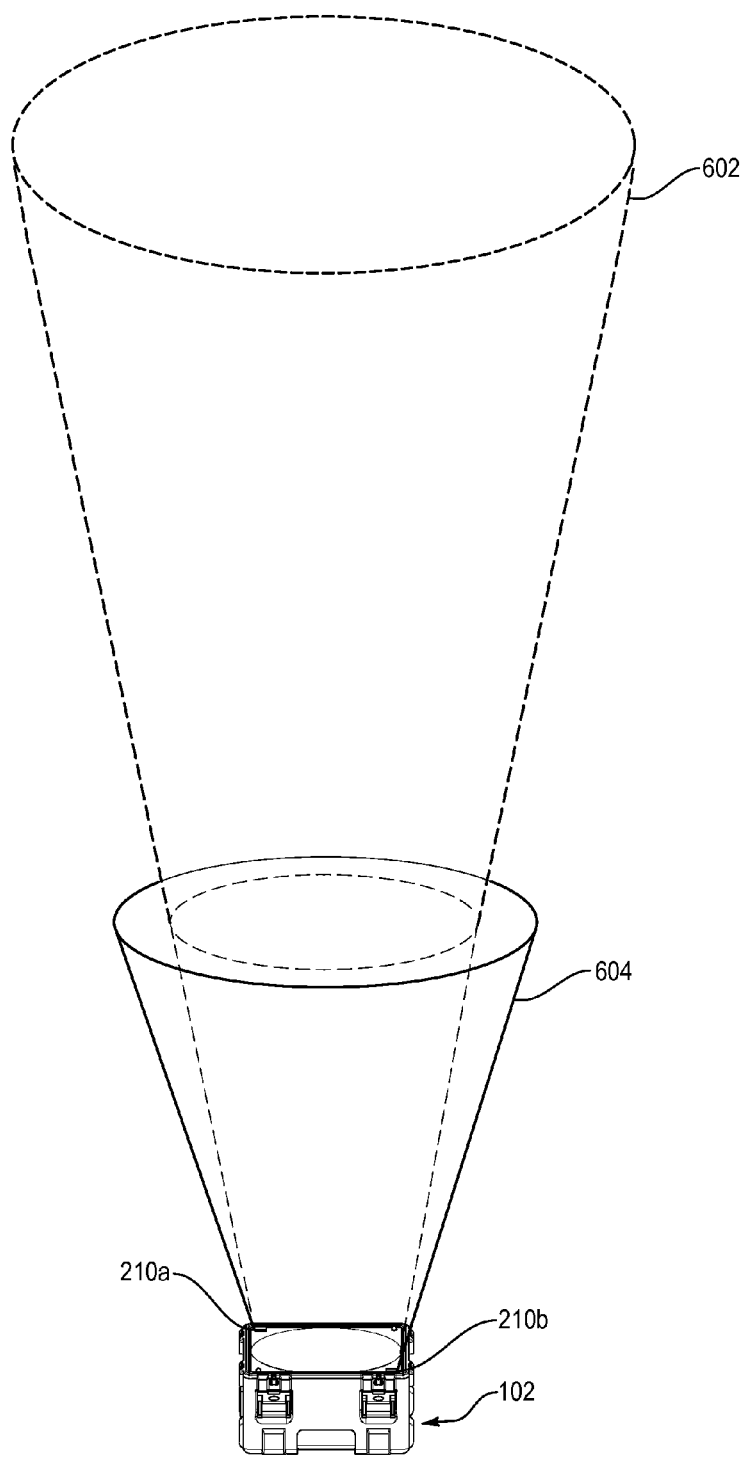
FIGS. 6A-6E illustrate an autonomous landing sequence of an unmanned aerial vehicle in connection with an unmanned aerial vehicle ground station in accordance with one or more embodiments.

As discussed above, in one or more embodiments, the UAVGS 102 includes a plurality of energy transmitters 210a, 210b (shown in FIG. 2). In at least one embodiment, the energy transmitters 210a, 210b are configured to transmit energy waves in a circularly polarized energy field with a slight beam spread. For example, as shown in FIG. 6A, the energy transmitters 210a, 210b can create a first energy field 602 emanating from the UAVGS 102. In one or more embodiments, the first energy field 602 can be of a type of energy wave that is suitable for detection over longer distances. For instance, the first conical energy field 602 can consist of infrared energy, which can be detected by the UAV 104 as far as 500 feet away.

As discussed above, every energy field transmitted by the energy transmitters 210a, 210b can be associated with various characteristics. For example, an energy field can be associated with characteristics including, but not limited to, the type of energy wave within the energy field, the shape of the energy field, the angle of the beam spread of the energy field (e.g., the first energy field 602 is described as having a three degree beam spread, but in other embodiments, the first energy field 602 can have a beam spread that is wider or narrower than three degrees), the effective height of the energy field (e.g., the height past which the energy field is not detectable due to dissipation), the number of energy types within the energy field, etc.

Also as discussed above, the plurality of energy transmitters 210a, 210b can transmit more than one type of energy wave. For example, as shown in FIG. 6A, the energy transmitters 210a, 210b can create a second energy field 604 emanating from the UAVGS 102, in addition to the first energy field 602. In one or more embodiments, the second energy field 604 can be a type of energy wave that is suitable for detection over shorter distances. For instance, the second energy field 604 can consist of electromagnetic energy, which the energy sensors 310a-310d of the UAV 104 can accurately detect over a few feet of the UAV 104.

It will be understood that while the first energy field 602 and the second energy field 604 are illustrated in FIG. 6A as having flat inverted bases, in one or more embodiments, the energy within the energy fields 602, 604 merely tapers off until undetectable by the energy sensor 310a-310d of the UAV 104. Furthermore, although the energy fields 602, 604 are illustrated in FIG. 6A as being concentric, in one or more alternative embodiments, the energy transmitters 210a, 210b may transmit the energy fields 602, 604 in a way that the energy fields are partially overlapping. In that case, the UAV controller 108 may perform an autonomous landing by keeping the UAV 104 within the partial overlap of the fields 602, 604. For example, in some embodiments, the UAVGS 102 may include up to four energy transmitters, where each energy transmitter is located at a corner of the UAVGS 102 and transmits an energy field with at least some degree of beam spread. Thus, the arrangement of the energy transmitters and the beam spread of each energy field can cause the transmitted energy fields to overlap at a point directly over the center of the UAVGS 102. The UAV controller 108 can identify the overlap portion of the energy fields and utilize the overlap portion to guide the UAV 104 to the landing site of the UAVGS 102. In one or more embodiments, the UAVGS 102 may only include two or three energy transmitters that are located at corners or along one or more sides of the UAVGS 102. Regardless of the placement of the energy transmitters, the energy transmitters can create overlapping energy fields by which the UAV controller 108 can navigate the UAV 104 toward the landing site of the UAVGS 102.

Additionally, in at least one embodiment, the energy transmitter 210a may transmit one type of energy field that partially overlaps with a second type of energy field transmitted by the energy transmitter 210b. In that case, the UAV controller 108 can navigate the UAV 104 based on a known placement of the different types of energy fields, even if there is little or no overlap between the different types of energy fields. For example, in one embodiment, one energy transmitter 210a can transmit a first type of energy field that the UAV controller 108 reads to indicate a one side (e.g., a north side) of the UAVGS 102, and the other energy transmitter 210b can transmit a second type of energy field that the UAV controller 108 reads to indicate an opposing side (e.g., a south side) of the UAVGS.

When energy field types are associated with a geographic direction (e.g., north or south) the UAVGS 102 can be oriented to correspond to the specific geographic directions associated with the energy fields. Thus, during a landing sequence, the UAV controller 108 can navigate the UAV 104 such that the UAV 104 is correctly positioned within the overlap of the north and south indicating energy fields that correspond with the landing site of the UAVGS 102. For example, in the event that the UAV 104 only detects the north energy field, the UAV controller 108 can use a built-in compass to cause the UAV 104 to navigate in a southern direction until the UAV 104 also detects the south energy field. Thus, even when the UAV is not located within the overlap portion of the energy fields, the UAV controller 108 can utilize a built-in compass in connection with direction indicating energy fields in order to successfully position and navigate the UAV 104 to land on the landing site of the UAVGS 102.

Figure 6B:
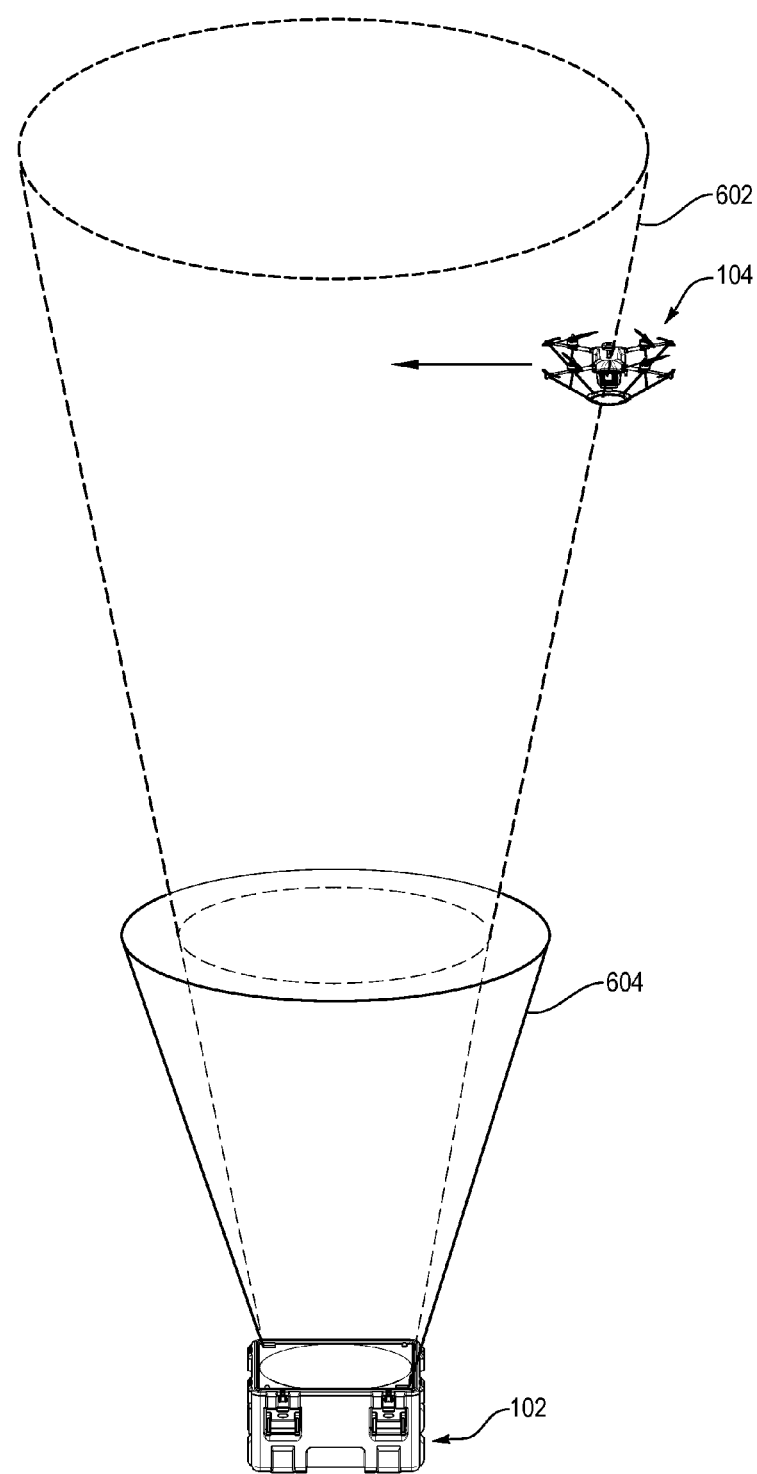

As mentioned above, a two-stage autonomous landing process can begin by the flight manager 128 utilizing GPS navigation to position the UAV 104 in the general area above the UAVGS 102 (e.g., an area in which the UAV can detect the energy field 602. Once the UAV 104 is in the general area above the UAVGS 102, the flight manager 128 can fly the UAV 104 in various patterns (e.g., back and forth, concentric circles, etc.) until at least one of the sensors 310a-310d of the UAV 104 detects the energy field 602. For example, the flight manager 128 can continuously compare readings taken from each of the sensors 310a-310d until at least one sensor returns an energy reading that is higher than the other sensors. Upon detecting this difference between the sensors, the flight manager 128 can cause the UAV 104 to move toward the sensor that returned the higher energy reading. Thus, as illustrated in FIG. 6B, the flight manager 128 can move the UAV 104 along the directional arrow in response to detecting a higher energy wave reading from at least one of the sensors 310a, 310b, 310c, or 310d.

In at least one embodiment, the flight manager 128 can control the desired lean angles of the UAV 104 in various ways, so as to be more resistant to the wind. For example, the flight manager 128 can include a one-stage controller. Typically, UAV position controllers (e.g., rotors) are implemented as two-stage controllers (e.g., the position of the UAV 104 is directly associated with both the velocity and the lean angle of the UAV position controls). In at least one embodiment, the flight manager 128 includes the one-stage controller that responds to only the lean angle of the UAV position controls. Thus, the flight manager 128 can respond to changes in a position error of the UAV 104 over a shorter period of time.

Additionally, the flight manager 128 can include an acceleration feed forward term. The acceleration feed forward term allows for the UAV controllers to respond to wind gust more quickly by comparing the last desired acceleration of the UAV controllers to the current acceleration of the UAV controllers. In at least one embodiment, the acceleration feed forward term can use the difference between the last desired acceleration of the UAV controllers and the current acceleration of the UAV controllers to offset the current desired UAV controller acceleration. Furthermore, the flight manager 128 can include a D-term boost. In at least one embodiment, the D-term boost is representative of the amplification term associated with the UAV 104 is moving away from the UAVGS 102. For example, the D-term boost can help counteract inertia as the wind blows the UAV 104 off-target. Additionally, the flight manager 128 can also include gain scheduling. In one or more embodiments, the UAV controller gains are dynamically scheduled based on the altitude of the UAV 104. For example, the gain scheduling can enable the UAV controllers to have a more aggressive control response as they come closer to the UAVGS 102.

The flight manager 128 can continue to move the UAV 104 along the directional arrow until the energy readings from all the sensors 310a-310d match. As described above, the first energy field 602 can include energy waves that strengthen in intensity as the UAV 104 moves toward the center of the first energy field 602. Accordingly, in at least one embodiment, as the UAV 104 detects the strengthening intensity of the first energy field 602, the flight manager 128 can transition from a GPS guidance system to a guidance system dictated only by the first energy field 602.

For example, the flight manager 128 can transition from GPS to the guidance system dictated by the first energy field 602 when the flight manager 128 determines that the UAV 104 is in a "valid" state. In one or more embodiments, the UAV 104 is in a "valid" state when all energy sensors associated with the UAV 104 detect the same intensity energy waves within the first energy field 602, thus indicating that the UAV 104 is centered over the UAVGS 102. In at least one embodiment, the transition from GPS guidance to the guidance system dictated by the first energy field 602 is accomplished by the flight manager 128 applying an offset to a current position of the UAV 104 based on using the energy field 602. In one or more embodiments, the offset that is calculated as the difference in position between the GPS navigational position estimate, and the UAV 104 position determined by the input analyzer 132 based on the sensor handler 122 inputs corresponding to the detected energy field 602, as described above. The flight manager 128 can then reduce the distance offset to zero at a fixed rate (e.g., distance per time) to fully transition using only the energy field 602 for guidance control.

Figure 6C:
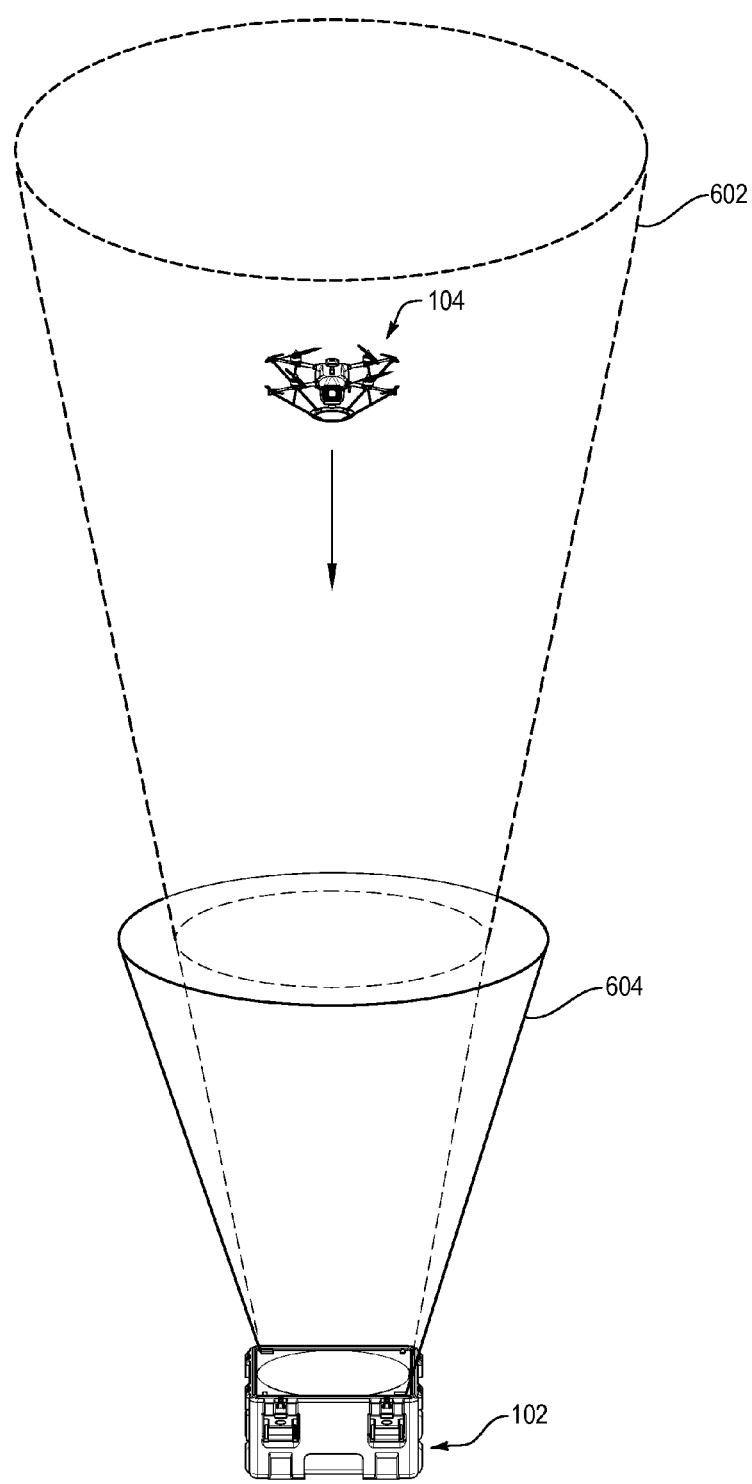

Once the flight manager 128 detects equivalent energy readings from all the sensors 310a-310d, the flight manager 128 can transition to a descent phase of the autonomous landing sequence and can cause the UAV 104 to descend toward the UAVGS 102. In one or more embodiments, due to the shape of the first energy field 602 and the second energy field 604, the UAV 104 may travel away from the center of the first energy field 602 or the second energy field 604 during a vertical descent. Accordingly, in response to detecting one or more drop-offs in the energy wave readings of one or more of the energy sensors 310a-310d during the UAV 104 descent (e.g., indicating the UAV 104 has slipped off-center from the UAVGS 104 or has traveled outside one of the fields 602, 604), the flight manager 128 can cause the UAV 104 to slow decent, stop descending, or to ascend slightly, until all sensors 310a-310d again have consistent energy readings, indicating that the UAV 104 is once again centered over the UAVGS 102. For example, as shown in FIG. 6C, the UAV 104 can descend within the first energy field 602 and the second energy field 604 along the directional arrow in order to autonomously land on the UAV 102.

Figure 6D:
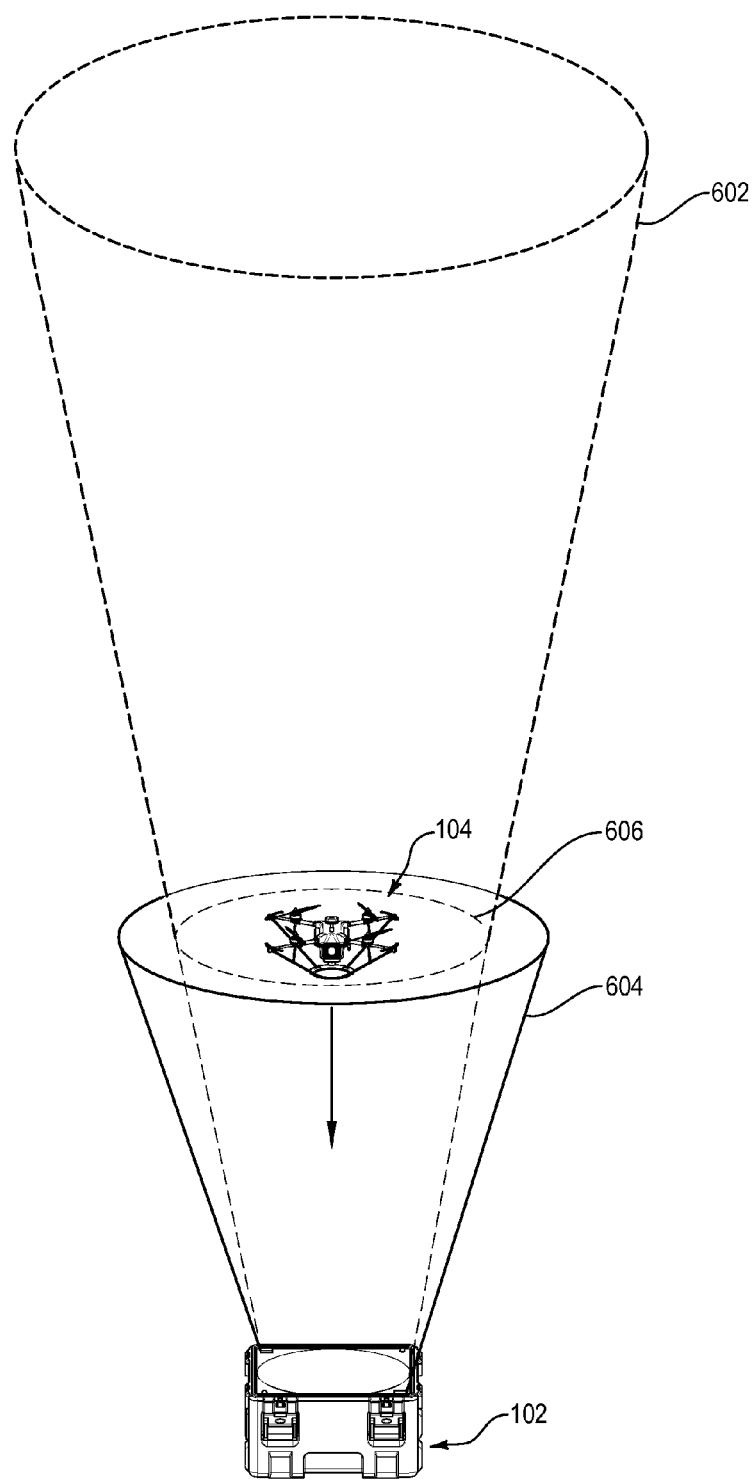

As mentioned above, the autonomous landing system 100 can enable a two-stage autonomous landing of the UAV 104 on the UAVGS 102. Accordingly, as illustrated in FIG. 6D, the transmission manager 110 of the UAVGS controller 106 can transmit two different types of energy waves, as in the first energy field 602 and the second energy field 604. Thus, as illustrated in FIG. 6D, the flight manager 128 can transition from utilizing a first type of energy wave to utilizing a second type of energy wave at a transition point 606 in order to autonomously land the UAV 104.

In one or more embodiments, the sensors 310a-310d of the UAV 104 can simultaneously detect and/or read more than one type of energy wave. Additionally, as described above, the energy waves transmitted within the first energy field 602 and within the second energy field 604 have effective ranges beyond which the power associated with each energy wave dissipates and is not readily detectable. Thus, in one or more embodiments, the flight manager 128 can transition from utilizing the guidance of the first energy field 602 to utilizing the guidance of the second energy field 604 when the sensors 310a-310d detect that the intensity of the energy waves within the second energy field 604 are above a predetermined threshold. For example, the intensity of the energy waves within the second energy field 604 become weaker as the energy waves move farther away from the UAVGS 102. Accordingly, even though the sensors 310a-310d of the UAV 104 can detect both energy waves within the first energy field 602 and the second energy field 604 above the transition point 606, in one or more embodiments, the flight manager 128 will only utilize the energy within the second energy field 604 for guidance purposes below the transition point 606.

Figure 6E:
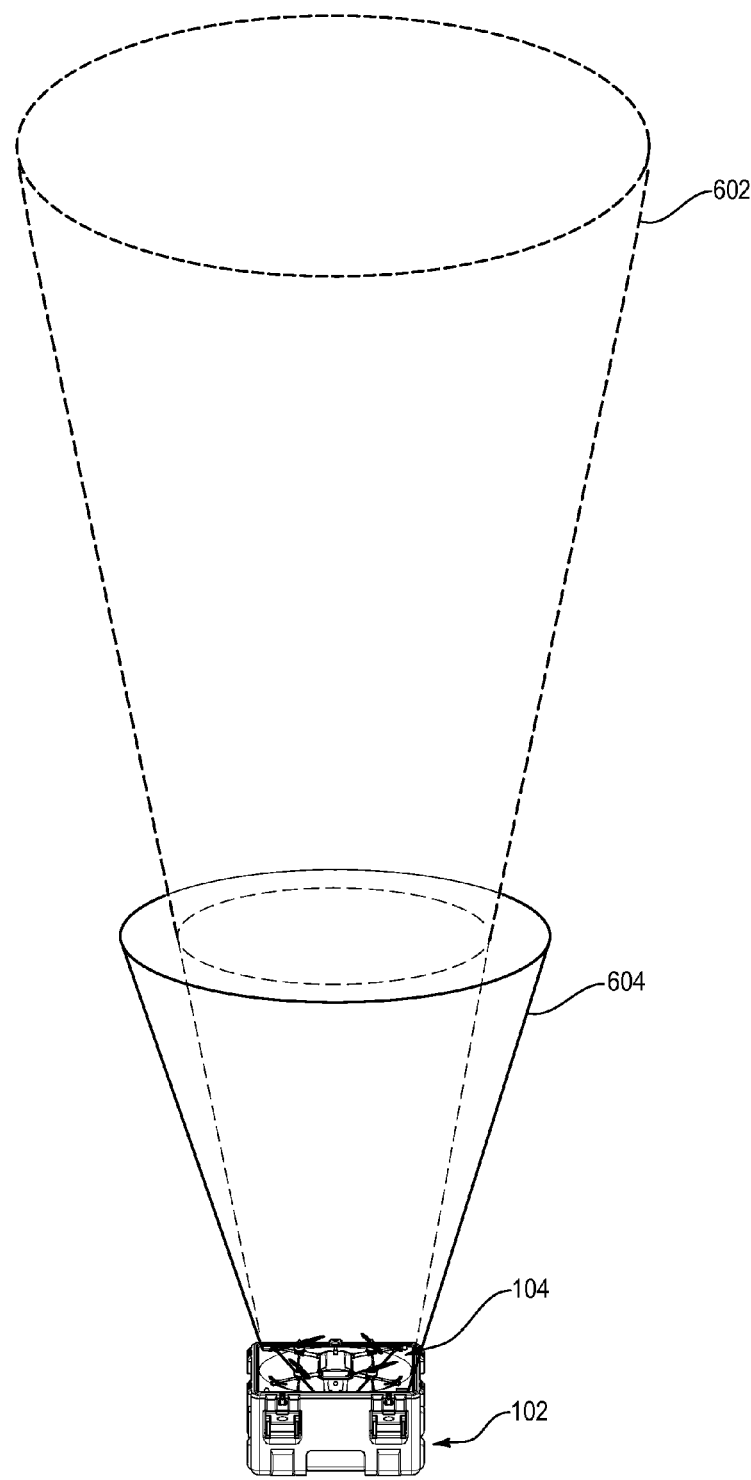

The autonomous landing sequence ends when the landing base 306 of the UAV 104 is within the landing site 204 of the UAVGS 102. The UAV controller 108 can shut off the rotors 304a-304b in response to successfully navigating the UAV 104 into the UAVGS 102. Additionally, as shown in FIG. 6E, when the landing base 306 of the UAV 104 is within the landing pad 204 of the UAVGS 102, the UAV 104 is situated within the UAVGS 102 such that the lid 202 of the UAVGS 102 can close, thereby containing the UAV 104. In one or more embodiments, once the autonomous landing sequence ends, the UAVGS controller 106 can cause all energy transmissions from the UAVGS 106 to cease.

FIGS. 1-6E, the corresponding text, and the above-discussed examples provide a number of different methods, systems, and devices for controlling a UAV. In addition to the foregoing, one or more embodiments of the system 100 can also be described in terms of flowcharts comprising acts and steps in a method for accomplishing a particular result. For example, FIG. 7 may be performed with less or more steps/acts or the steps/acts may be performed in differing orders. Additionally, the steps/acts described herein may be repeated or performed in parallel with one another or in parallel with different instances of the same or similar steps/acts.

Figure 7:
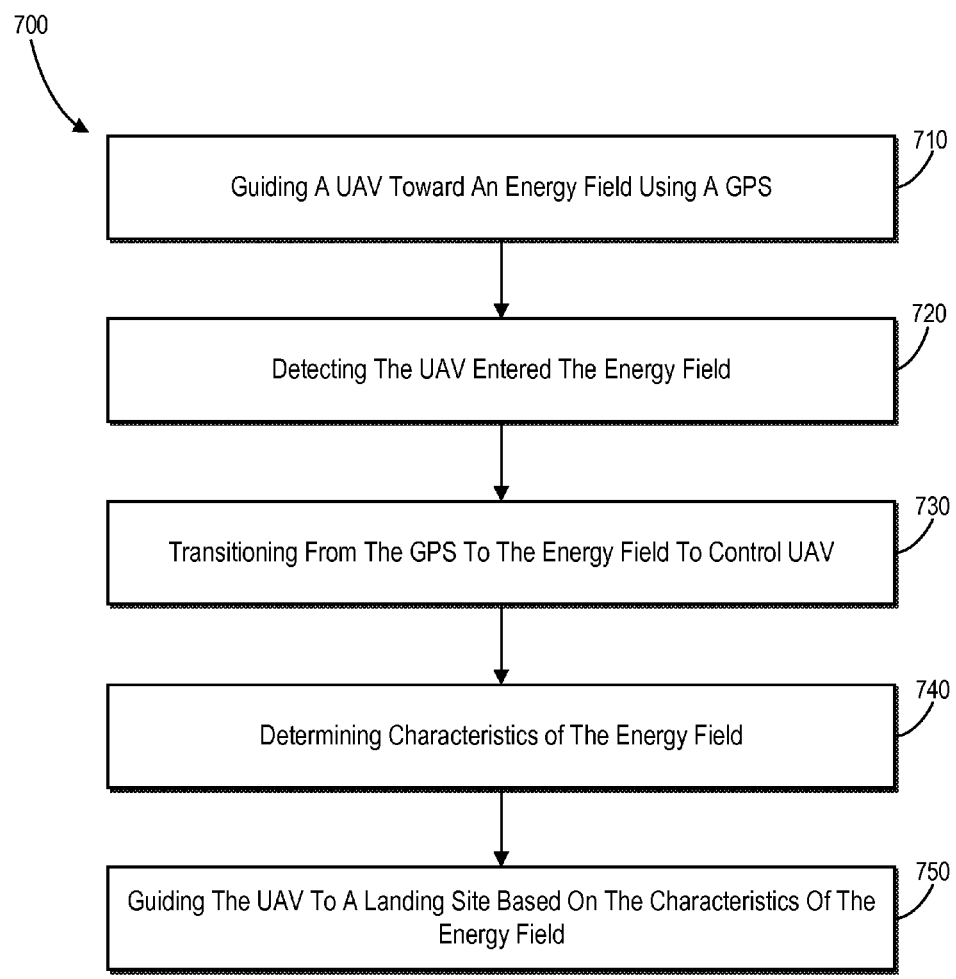
FIG. 7 illustrates a flowchart of a series of acts in a method of autonomously landing an unmanned aerial vehicle in accordance with one or more embodiments.

FIG. 7 illustrates a flowchart of one example method 700. For example, the method 799 can include a method of autonomously landing a UAV. As illustrated in FIG. 7, the method 700 includes an act 710 of guiding a UAV toward an energy field using a GPS. In particular, the act 710 can include guiding an unmanned aerial vehicle (UAV) 104 toward an energy field transmitted from a ground station, wherein guiding the UAV toward the energy field comprises using a global positioning system (GPS) to control the UAV. In one or more embodiments, for example, the UAV 104 can comprise a computing device that can determine how to control (e.g., maneuver) the UAV based on GPS coordinates that correspond to the position of the UAV. Additionally, the UAV can have access to GPS coordinates of the UAVGS 102, and thus, the computing device can provide control outputs to guide the UAV toward a position associated with the GPS coordinates of the UAVGS 102.

The method 700 also includes an act 720 of detecting that the UAV entered the energy field. In particular, the act 720 can include detecting, by a computing device, the UAV entered the energy field transmitted from the ground station.

In one or more embodiments, for example, the UAV 104 can include one or more sensors 308 and/or 310a-d that can detect the energy field 602 emitted from the UAVGS 102. For instance, and as described above in detail, the UAV 104 can detect a light field emitted from one or more light sources on the UAVGS 102. Alternatively, or additionally, the UAV 104 can detect energy waves in the form of RF, electromagnetic, or any other types of energy waves.

The method 700 further includes an act 730 of transitioning from the GPS to the energy field to control the UAV. In particular, the act 730 can include transitioning from using the GPS to control the UAV to using the energy field to control the UAV. In one or more embodiments, for instance, transitioning from the GPS to the energy field to control the UAV 104 includes a computing device determining a first position of the UAV 104 based on the GPS and determining a second position of the UAV 104 based on the energy field 602. In addition, the computing device can compare the first position to the second position to determine an offset representing the difference between the first position and the second position. Moreover, the computing device can transition between GPS based control and energy field based control by applying the offset to a determined current position of the UAV 104 based on using the energy field 602. Furthermore, the computing device can decrease the offset to zero over a defined period of time until the control of the UAV 104 is based solely on the energy field 602.

Additionally, the method 700 includes an act 740 of determining characteristics of the energy field. In particular, the act 740 can include determining, by the computing device on the UAV, one or more characteristics of the energy field. For instance, one or more characteristics of the energy field can include a distance between two light emitting sources on a digital image captured from the perspective of the UAV 104, wherein the distance corresponds to an altitude of the UAV 104. Additionally, or alternatively, one or more characteristics can include an intensity of the energy field 602. For instance, the computing device can determine a first intensity of the energy field 602 that corresponds with a first energy sensor (e.g., 310a) and a second intensity of the energy field 602 that corresponds with a second energy sensor (e.g., 310b).

As further illustrated in FIG. 7, the method 700 can also include an act 750 of guiding the UAV to a landing site based on the characteristics of the energy field. In particular, act 750 can include, based on the one or more characteristics of the energy field, guiding the UAV to a landing site of the ground station. For instance, in one or more embodiments, the UAV 104 can include analyzing the characteristics of the energy field to provide a control output that causes one or more rotors of the UAV to position the UAV into a landing site at the UAVGS 102.

In one or more embodiments, the method 700 can further include guiding the UAV based on multiple energy fields comprising multiple types of energy waves. For example, the method 700 can include positioning the UAV based on a first energy field comprising a first type of energy wave. In addition, the method 700 can include detecting a second energy field and transitioning to controlling the UAV based on the second energy field. For instance, and as explained above, some types of energy waves can produce energy fields to provide accurate control at short distances (e.g., close to the landing site), while other types of energy waves can produced energy fields that have a large range so that the UAV can easily detect the energy field (e.g., far from the landing site). Thus, method 700 can include detecting and using one or more energy fields throughout a corresponding number of phases during a landing sequence of the UAV.

Figure 8:
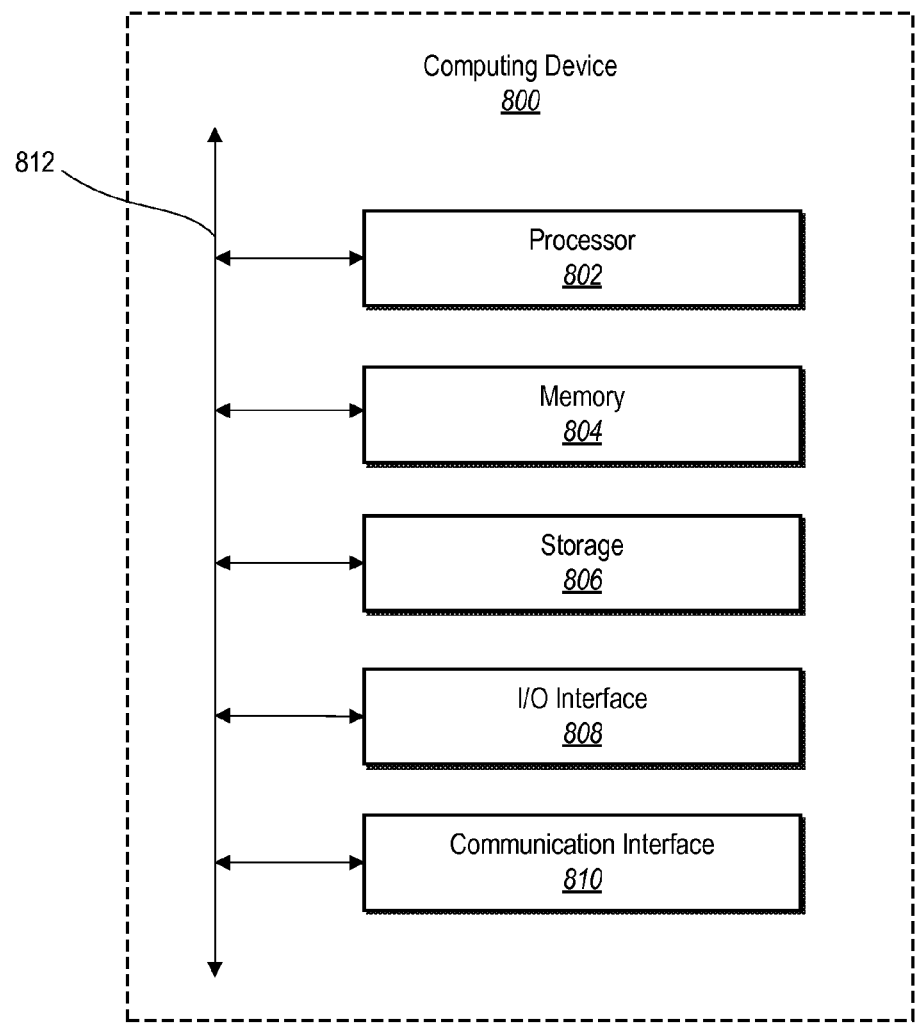
FIG. 8 illustrates a block diagram of an exemplary computing device in accordance with one or more embodiments.

FIG. 8 illustrates a block diagram of exemplary computing device 800 that may be configured to perform one or more of the processes described above (e.g., as described in connection with the flight manager 128 of the UAV controller 108). One will appreciate that one or more computing devices such as the computing device 800 may implement the system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive ("HDD"), a floppy disk drive, flash memory, an optical disc, a magneto-optical disc, magnetic tape, or a Universal Serial Bus ("USB") drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANS-PORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method of autonomously landing an unmanned aerial vehicle (UAV), comprising:
   guiding an unmanned aerial vehicle (UAV) toward an energy field transmitted from a ground station, wherein guiding the UAV toward the energy field comprises using a global positioning system (GPS) to control the UAV, and wherein the energy field comprises light energy waves transmitted from at least two light emitting sources located on the ground station;
   detecting, by a computing device, the UAV entered the energy field transmitted from the ground station;
   transitioning from using the GPS to control the UAV to using the energy field to control the UAV;
   determining, by the computing device on the UAV, one or more characteristics of the energy field; and
   based on the one or more characteristics of the energy field, guiding the UAV to a landing site of the ground station.

2. The method of claim 1, wherein the energy field further comprises energy waves from one of the following energy wave types: radio frequency or electromagnetic.

3. The method of claim 2, wherein detecting the UAV entered the energy field comprises using a camera located on the UAV to detect at least one of the light energy waves from the at least two light emitting sources located on the ground station.

4. The method of claim 3, further comprising:
   generating, using the camera, a digital image that depicts two light spots corresponding to the at least two light emitting sources located on the ground station from the perspective of the UAV;
   measuring a distance between the two light spots depicted within the digital image to determine the one or more characteristics of the energy field; and calculating an altitude of the UAV based on the measured distance between the two light spots depicted within the digital image.

5. The method of claim 4, wherein guiding the UAV to the landing site of the ground station comprises using the calculated altitude to determine a rate of decent of the UAV toward the landing site of the ground station.

6. The method of claim 1, wherein the energy field comprises a first energy field and a second energy field, and wherein guiding the UAV to the landing site of the ground station further comprises:
   using the first energy field to guide the UAV to the landing site of the ground station during a first phase of a landing sequence, wherein the first energy field comprises a first type of energy wave;
   detecting the second energy field that at least partially overlaps with the first energy field, wherein the second energy field comprises a second type of energy wave; and
   using the second energy field to guide the UAV to the landing site of the ground station during a second phase of the landing sequence.

7. The method of claim 6, wherein the first type of energy wave is a radio frequency energy wave.

8. The method of claim 1, wherein transitioning from using the GPS to control the UAV to using the energy field to control the UAV comprises:
   determining a first position of the UAV based on the GPS;
   determining a second position of the UAV based on the energy field;
   comparing the first position to the second position to determine an offset representing the difference between the first position and the second position;
   applying the offset to a determined current position of the UAV based on using the energy field; and
   decreasing the offset to zero over a defined period of time.

9. The method of claim 1, further comprising identifying a valid state, wherein the valid state indicates that the UAV is positioned along a decent path within the energy field.

10. The method of claim 9, wherein identifying the valid state comprises determining that each of a plurality of sensors located on the UAV detect the same intensity of the energy field.

11. An unmanned aerial vehicle (UAV) comprising:
    a main body;
    a plurality of rotors positioned about the main body to power the movement of the UAV while in flight;
    one or more sensors capable of detecting an energy field; and
    a computing device communicatively coupled to the one or more sensors and the plurality of rotors, wherein the computing device:
    receives input from the one or more sensors representative of a detected energy field emitted from a ground station, wherein the energy field comprises light energy waves transmitted from at least two light emitting sources located on the ground station;
    determines one or more characteristics of the detected energy field; and
    based on the one or more characteristics of the detected energy field, provides a control output to one or more of the plurality of rotors to guide the movement of the UAV onto a landing site of the ground station.

12. The UAV as recited in claim 11, wherein the energy field further comprises energy waves from one of the following energy wave types: radio frequency or electromagnetic.

13. The UAV as recited in claim 11, wherein the one or more sensors comprise one or more of a camera or an energy sensor.

14. The UAV as recited in claim 11, wherein the computing device further:
   determines a first intensity of the detected energy field corresponding to a first sensor of the one or more sensors;
   determines a second intensity of the detected energy field corresponding to a second sensor of the one or more sensors; and
   wherein providing the control output to one or more of the plurality of rotors to guide the movement of the UAV onto a landing site of the ground station comprises comparing the first intensity to the second intensity to determine the control output.

15. The UAV as recited in claim 14, wherein the computing device further determines the control output to move the UAV to a position within the energy field such that the first intensity corresponding to the first sensor matches the second intensity corresponding to the second sensor.

16. A system for landing an aerial vehicle, comprising:
   a ground unit, comprising:
   a landing site having a recess; and
   one or more energy transmitters that produce an energy field extending upward from the landing site, wherein the energy field comprises light energy waves transmitted from at least two light emitting sources located on the ground unit;
   an unmanned aerial vehicle (UAV), comprising:
   a landing base that geometrically corresponds to the recess of the landing site;
   one or more sensors capable of detecting the energy field produced from the one or more energy transmitters of the ground unit; and
   a computing device communicatively coupled to the one or more sensors, wherein the computing device:
   receives input from the one or more sensors related to the energy field;
   determines one or more characteristics of the energy field based on the received input; and
   based on the one or more characteristics of the detected energy field, provides a control output to guide the movement of the UAV into the recess of the landing site.

17. The system as recited in claim 16, wherein the recess of the landing site comprises a conical shape.

18. The system as recited in claim 16, wherein the computing device further comprises determining, based on the one or more characteristics of the detected energy field, the landing base is at least partially within the recess of the landing site.

19. The system as recited in claim 18, wherein the computing device further cuts power to a plurality of rotors on the UAV upon determining the landing base is at least partially within the recess of the landing site.

20. The system as recited in claim 19, wherein cutting the power to the plurality of rotors causes the landing base to interact with the recess of the landing site and secure the UAV at the landing site of the ground unit.

* * * * *